US005543848A

United States Patent [19]

Murakami et al.

[11] Patent Number: 5,543,848

[45] Date of Patent: Aug. 6, 1996

[54] METHOD AND APPARATUS FOR FILTERING AND CODING IMAGES BASED ON CHARACTERISTICS OF AN INPUT IMAGE SIGNAL

[75] Inventors: Tokumichi Murakami; Yoshiaki Kato; Toshiaki Shimada, all of Kanagawa, Japan

[73] Assignee: Mitsubishi Denki Kabushiki Kaisha, Tokyo, Japan

[21] Appl. No.: 355,987

[22] Filed: Dec. 14, 1994

Related U.S. Application Data

[62] Division of Ser. No. 157,638, Nov. 24, 1993.

[30] Foreign Application Priority Data

| | | | |
|---|---|---|---|
| Dec. 25, 1992 | [JP] | Japan | 4-346552 |
| Feb. 25, 1993 | [JP] | Japan | 5-036371 |
| Aug. 23, 1993 | [JP] | Japan | 5-207842 |

[51] Int. Cl.$^6$ .......... H04N 7/32

[52] U.S. Cl. .......... 348/416; 348/405; 348/409

[58] Field of Search .......... 348/384, 390, 348/400, 401, 402, 409, 412, 415, 416, 405, 419, 420; H04N 7/137

[56] References Cited

U.S. PATENT DOCUMENTS

| | | | |
|---|---|---|---|
| 4,047,221 | 9/1977 | Yasuda et al. . | |
| 4,703,350 | 10/1987 | Hinman | 348/402 |
| 4,706,260 | 11/1987 | Fedele et al. . | |
| 4,754,492 | 6/1988 | Malvar | 348/420 |
| 4,794,455 | 12/1988 | Ericsson | 348/412 |
| 4,837,618 | 6/1989 | Hatori et al. | 348/401 |
| 4,893,123 | 1/1990 | Boisson | 348/419 |
| 5,020,401 | 4/1991 | Murakami et al. . | |
| 5,089,888 | 2/1992 | Zdepski et al. | 348/405 |
| 5,089,889 | 2/1992 | Sugiyama | 348/415 |
| 5,126,841 | 6/1992 | Tanaka et al. | 348/415 |
| 5,144,426 | 9/1992 | Tanaka et al. | 348/416 |
| 5,194,950 | 3/1993 | Murakami et al. . | |
| 5,237,410 | 8/1993 | Inoue | 348/409 |

FOREIGN PATENT DOCUMENTS

| | | |
|---|---|---|
| 0370315 | 5/1990 | European Pat. Off. . |
| 0444918 | 9/1991 | European Pat. Off. . |
| 0476603 | 3/1992 | European Pat. Off. . |
| 63-121374 | 5/1988 | Japan . |
| 63-199589 | 8/1988 | Japan . |
| 63-208382 | 8/1988 | Japan . |
| 1228384 | 9/1989 | Japan . |
| 3136586 | 6/1991 | Japan . |

OTHER PUBLICATIONS

Helgeson, Tanji & Kilgore "Impact of Recent Compression/Decompression Technologies in Video Distribution Systems" Honeywell, Inc. 1992 IEEE Oct. 5, 1992, pp. 568–572.

Murakami, Kinjo, Kamizawa & Shimada "A 24 bit DSP for Motion Video Codec and Software Development Support System" Mitsubishi Electric Corporation, 1989 IEEE, pp. 1929–1932.

Ohtsuka, Nakasu, Shishikui, Imaizumi & Nakanishi "Development of 135 Mbit/s HDTV Codec" Signal Processing: Image Communication 4. 1992, pp. 379–387.

*Primary Examiner*—Tommy P. Chin
*Assistant Examiner*—Richard Lee
*Attorney, Agent, or Firm*—Wolf, Greenfield & Sacks, P.C.

[57] ABSTRACT

An interframe coding system which eliminates higher frequency components contained in an image signal effectively and adaptively with an adaptive filter provided in a coding loop. The adaptive filter eliminates the higher frequency components with the optimal filtering intensity for an image signal specified with a filtering coefficient which is decided by a filter controller. The filtering coefficient is decided by normalization of the difference between an input image signal and a predictive signal from a frame memory by the "Activity" of the input image signal or the predictive signal. The "Activity" can be based upon the sum of the absolute or squared difference values based upon the mean value of luminance intensity of pixels of the image signal.

33 Claims, 41 Drawing Sheets

LOCAL DECODER
ENCODER
FRAME MEMORY
MOTION VECTOR DETECTOR
ADAPTIVE FILTER
FILTER CONTROLLER
1
2
3
4
5
6
11
12
13
14
15
16
17
18
21
22
23
24

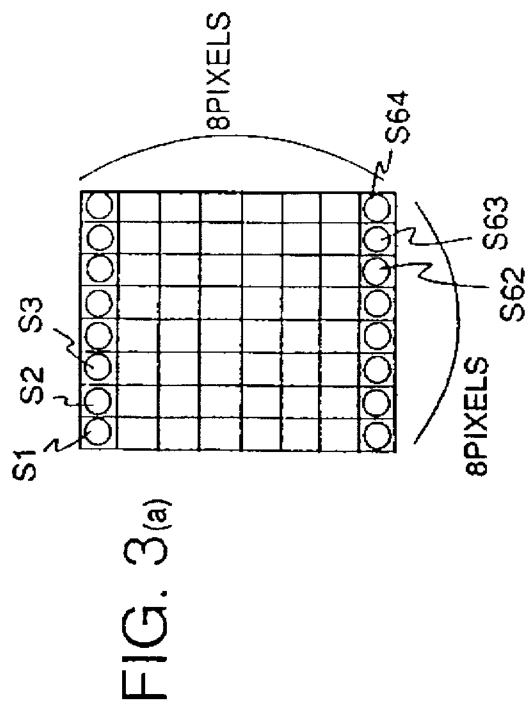
FIG. 3(a)
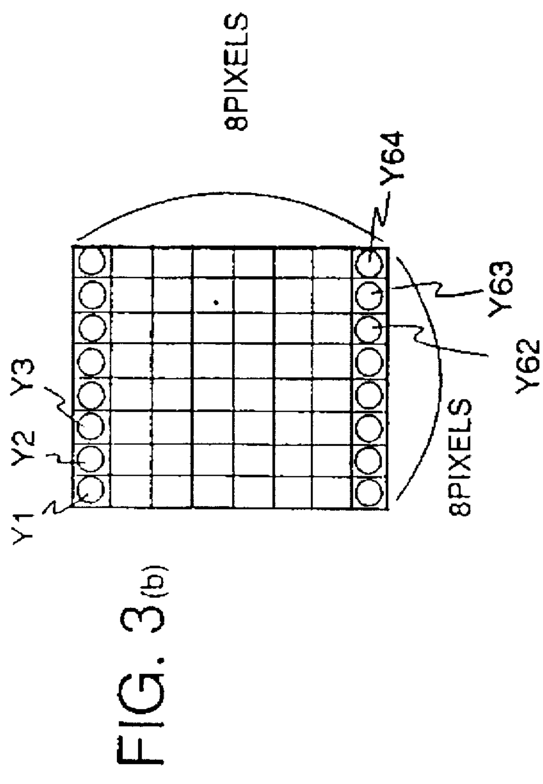
FIG. 3(b)
DIFFERENCE $N = \sum_{i=1}^{64} |Si-Yi|$
FIG. 3(c)
DIFFERENCE $N = \sum_{i=1}^{64} |Si-Yi|^2$
FIG. 3(d)

FIG. 5(b) "ACTIVITY" $X = |X1| + |X2| + |X3| + |X4| + |X5| + |X6| + |X7| + |X8|$

FIG. 5(c) "ACTIVITY" $X = X1^2 + X2^2 + X3^2 + X4^2 + X5^2 + X6^2 + X7^2 + X8^2$

FLOWCHART OF FILTERING CONTROL IN THE FILTER CONTROLLER

8×8 PIXELS

8×8 PIXELS

8×8 PIXELS

FIG. 11(a)
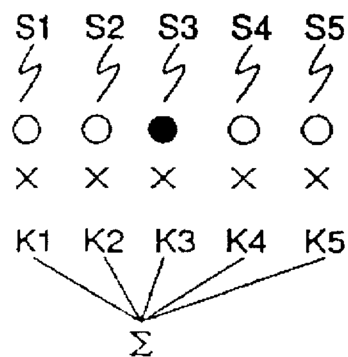
FIG. 11(b)
K1+K2+K3+K4+K5=1.0
FIG. 11(c)
K1=0.1
K2=0.1
K3=0.6
K4=0.1
K5=0.1
FIG. 11(d)
K1=0.0
K2=0.0
K3=1.0
K4=0.0
K5=0.0
FIG. 12
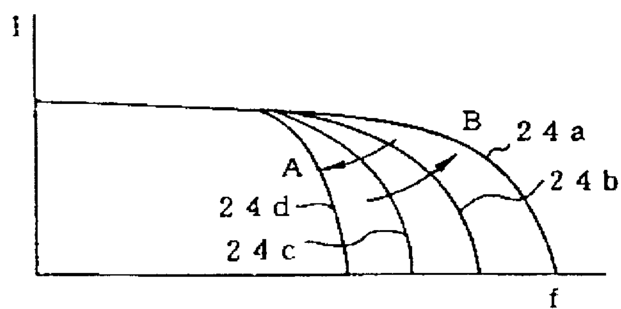

LOCAL DECODER
ENCODER
FRAME MEMORY
ADAPTIVE FILTER
FILTER CONTROLLER
1
3
4
5
6
12
14
15
16
17
18
21
22
23
24

ENCODER
LOCAL DECODER
ADAPTIVE FILTER
FRAME MEMORY
MOTION VECTOR DETECTOR
FILTER CONTROLLER
1
2
3
4
5
6
11
12
13
14
15
16
17
18
19
21
22
23
24

ENCODER
LOCAL DECODER
ADAPTIVE FILTER
FRAME MEMORY
FILTER CONTROLLER
1
3
4
5
6
12
14
16
17
18
19
21
22
23

ENCODER
LOCAL DECODER
FRAME MEMORY
MOTION VECTOR DETECTOR
ADAPTIVE FILTER
FILTER CONTROLLER
1
2
3
4
5
6
11
12
13
14
16
17
18
21
22
23
24
25

FIG. 18 (b) PIXEL DIFFERENCE D1 > D2 > D3

FIG. 18 (c) QUANTIZATION STEP SIZE PIXELS 1~8 SS1 < D1
PIXELS 9~16 SS2 < D2
PIXELS 17~24 SS3 < D3

FIG. 18 (d) SS1 > SS2 > SS3

ENCODER
LOCAL DECODER
FRAME MEMORY
MOTION VECTOR DETECTOR
CONTROLLER
1
2
3
4
5
6
11
12
13
14
16
17
18
21a
24
25

FRAME
FIRST FIELD
SECOND FIELD

CODING CONTROLLER
ENCODER
LOCAL DECODER
FRAME MEMORY
1
3
4
5
6
11
12
15
16
17
18
41
42
150

46
42
150
CONTROL SIGNAL GENERATOR
QUANTIZATION STEP SIZE · DCT COEFFICIENT · MODE SIG.
46c
46m
MODE SIG.
COMPARATOR
46b
12b
15b
WEIGHTING CKT.
46a
12
15
12a
15a

CODING CONTROLLER
41
42
150
ENCODER
4
16
LOCAL DECODER
5
17
6
18
13
FRAME MEMORY
1
11
MOTION VECTOR DETECTOR
2
ADAPTIVE FILTER
22
24
15
3
14
23
FILTER CONTROLLER
21
12

FLOWCHART OF THE BASIC OPERATION IN THE COMPARATOR note) INTRA : INTRAFRAME CODING

INTER : INTERFRAME CODING

FIG.31

MEMORY TABLE OF THE CONTROL SIGNAL GENERATOR (a)

| | QUANT | DCT COEFFICIENTS |
|---|---|---|
| "ACTIVITY" OF INPUT IMAGE SIG. 12b $\leq Th_{a1}$ | 2 | 64 |
| $Th_{a1} <$ "ACTIVITY" OF INPUT IMAGE SIG. 12b $\leq Th_{a2}$ | 3 | 36 |
| $Th_{a2} <$ "ACTIVITY" OF INPUT IMAGE SIG. 12b $\leq Th_{a3}$ | 4 | 36 |
| $Th_{a3} <$ "ACTIVITY" OF INPUT IMAGE SIG. 12b $\leq Th_{a4}$ | 5 | 36 |
| $Th_{a4} <$ "ACTIVITY" OF INPUT IMAGE SIG. 12b $\leq Th_{a5}$ | 6 | 21 |
| $Th_{a5} <$ "ACTIVITY" OF INPUT IMAGE SIG. 12b $\leq Th_{a6}$ | 7 | 21 |
| $Th_{a6} <$ "ACTIVITY" OF INPUT IMAGE SIG. 12b | 8 | 21 |

(b)

| | QUANT | DCT COEFFICIENTS |
|---|---|---|
| "ACTIVITY" OF PREDICTIVE ERR. SIG. 15b $\leq Th_{b1}$ | 2 | 64 |
| $Th_{b1} <$ "ACTIVITY" OF PREDICTIVE ERR. SIG. 15b $\leq Th_{b2}$ | 3 | 36 |
| $Th_{b2} <$ "ACTIVITY" OF PREDICTIVE ERR. SIG. 15b $\leq Th_{b3}$ | 4 | 36 |
| $Th_{b3} <$ "ACTIVITY" OF PREDICTIVE ERR. SIG. 15b $\leq Th_{b4}$ | 5 | 36 |
| $Th_{b4} <$ "ACTIVITY" OF PREDICTIVE ERR. SIG. 15b $\leq Th_{b5}$ | 6 | 21 |
| $Th_{b5} <$ "ACTIVITY" OF PREDICTIVE ERR. SIG. 15b $\leq Th_{b6}$ | 7 | 21 |
| $Th_{b6} <$ "ACTIVITY" OF PREDICTIVE ERR. SIG. 15b | 8 | 21 |

NOTE) DCT COEFFICIENTS: SHOWING THE NUMBER OF DCT COEFFICIENTS TO BE UTILIZED FROM THE FIRST IN ORDER OUT OF 64 COEFFICENTS.

CODING CONTROLLER
ENCODER
LOCAL DECODER
FRAME MEMORY
MOTION VECTOR DETECTOR
ADAPTIVE FILTER
1
2
3a
3b
4
5
6
11
12
13
14
15x
15y
16
17
18
22
24a
24b
41
42
150

CODING CONTROLLER
ENCODER
LOCAL DECODER
FRAME MEMORY
MOTION VECTOR DETECTOR
ADAPTIVE FILTER
1
2
3a
3b
4
5
6
11
12
13
14
15x
15y
16
17
18
22
24a
24b
41
42
150

CODING CONTROL SIG.
42
SELECT SIG.
150
"ACTIVITY" COMPARATIVE SELECTOR
46
"ACTIVITY" CALCULATOR
45
12a
15a 15c
41
12
15x 15y 46
42
150
CONTROL SIGNAL GENERATOR
QUANTIZATION STEP SIZE · DCT COFFICIENT · MODE SIG.
46c
46m
MODE SIG.
COMPARATOR
46b
12b
15b
15d
WEIGHTING CKT.
46a
12
15x
15y
12a
15a
15c

CODING CONTROLLER
ENCODER
LOCAL DECODER
FRAME MEMORY
MOTION VECTOR DETECTOR
ADAPTIVE FILTER
FILTER CONTROLLER
1
2
3
4
5
6
11
12
13
14
15
16
17
18
21
22
23
24
41
42
150

FILTERING AND CODING CONTROLLER
ENCODER
LOCAL DECODER
FRAME MEMORY
MOTION VECTOR DETECTOR
ADAPTIVE FILTER
50
42
4
150
16
5
17
6
18
13
1
2
11
14
24
15x
3
12

TRANSMISSION BUFFER
LOCAL DECODER
ENCODER
CODING CONTROLLER
FRAME MEMORY
160
100
101
5
17
6
18
16
4
42
1
150
41
15
3
11
12

ENCODER
LOCAL DECODER
FILTER
FILTER CONTROLLER
FRAME MEMORY
MOTION VECTOR DETECTOR
1
2
3
4
5
6
7
8
11
12
13
14
15
16
17
18
19
20

METHOD AND APPARATUS FOR FILTERING AND CODING IMAGES BASED ON CHARACTERISTICS OF AN INPUT IMAGE SIGNAL

This application is a division of application Ser. No. 08/157,638 filed on Nov. 24, 1993.

BACKGROUND OF THE INVENTION

1. Field of the Invention

This invention relates to an image coding system, more specifically to an interframe coding system, wherein an image signal is coded on a frame-to-frame difference basis.

2. Discussion of the Related Art

It is a common practice to remove redundant components in an image signal for a highly efficient coding. Especially with a dynamic image signal, an interframe coding is one of the preferable and typical arts. The interframe coding is a coding technique which codes a difference between a newly input uncoded image signal and a previously coded image signal.

FIG. 40 is a block diagram of a conventional interframe coding apparatus disclosed in Japanese Unexamined Patent Publication No. 208382/1988. The interframe coding apparatus according to the figure has a frame memory 1, a motion-vector detector 2, a subtractor 3, an encoder 4, a local decoder 5, an adder 6, a filter 7 and a filter controller 8. The frame memory 1 stores an image signal of the previous frame.

Operation of the conventional interframe coding system with a local decoding loop is now described with reference to the FIG. 40.

The input image signal 12 is compared with the image signal of the previous frame 11 stored in the frame memory 1 by a block-matching technique in the motion vector detector 2. The motion vector detector 2 detects the quantity and direction of motion of the input image signal 12 and outputs a motion vector signal 13. The frame memory 1 outputs a motion compensation predictive signal 14 based upon the motion vector signal 13. The subtractor 3 subtracts the motion compensation predictive signal 14 from the input image signal 12 to output a predictive error signal 15 or a difference signal.

The predictive error signal 15 is coded by quantization at the encoder 4, and a coded error signal 16 is output. The coded error signal 16 is decoded in the local decoder 5, and a local decoded error signal 17 is output. The local decoded error signal 17 is added to the motion compensation predictive signal 14 in the adder 6, and a local decoded signal 18 is output. The local decoded signal 18 is filtered by the filter 7 to eliminate higher frequency components in the signal. The filter smooths the local decoded signal and outputs a smoothed local decoded signal 19. Filtering is controlled by a control signal 20 output by the filter controller 8. The filter control signal 20 controls the filter based upon the motion vector signal 13.

The coded error signal 16 and the motion vector signal 13 are transmitted via a transmission line to an external decoding system.

Image coding is generally processed by the unit or block of 16×16 or 8×8 pixels of an image signal.

With reference to other conventional coding techniques, the filter 7 can be placed after the frame memory 1 in the local decoding loop instead of after the adder 6 as shown in FIG. 40. Further, filtering can be accomplished by an intra-block filter which processes pixels within a block, and by an inter-block filter which processes pixels involving the pixels in the neighboring blocks. Furthermore, a motion detection can be achieved with a smaller unit of a pixel than a full pixel. This is designed to detect the optimal block of pixels in the previous frame which match a block of pixels in the input image signal 12. These conventional techniques can contribute to eliminate higher frequency components or redundancy in the input image signal based upon the quantity of motion. Thus, they are effective for removing noise in the signal. Consequently, coding efficiency can be improved greatly with these conventional arts.

An intraframe coding with a local decoding loop is processed in the following manner according to the conventional coding with reference to FIG. 1. The input image signal 12 is directly coded by quantization in the encoder 4, where the coded error signal 16 is output. The coded error signal 16 is decoded in the local decoder 5, where the local decoded error signal 17 is output. The local decoded error signal 17 is stored in the frame memory 1. The coded error signal 16 is transmitted via a transmission line to an external decoding system.

The conventional interframe coding generally controls filtering based upon the motion vector, whereby an image signal can be filtered based upon the quantity of motion. In other words, a block of pixels representing motion of an image signal, or a motion block, is filtered with a low-pass filter (LPF) thereby eliminating the original definition to eliminate noise in the signal. On the other hand, a block of pixels representing no motion or a very small amount of motion, is not filtered.

FIG. 41 illustrates filtering different characteristics of the motion compensation predictive signal 14 using the LPF in relation with luminance intensity (I) versus frequency (f). In the figure, **14*a* designates a characteristic of the image signal from the frame memory 1 without LPF filtering. 14*b* designates a characteristic of the image signal from the frame memory 1** after LPF filtering.

In other words, a picture with no or little motion is unfiltered to keep its original definition as characteristic **14*a* shows. An image signal in motion is filtered with the LPF reducing its original definition to eliminate higher frequency components in the signal as characteristic 14*b* shows. Thus, LPF filtering eliminates higher frequency components, designated by the shaded portion in FIG. 41**, in the image signal based upon the quantity of motion of the image signal.

FIGS. 42(*a*), 42(*b*) and 42(*c*) respectfully illustrate LPF filtering characteristics of the input image signal 12, the motion compensation predictive signal **14*a*, and the predictive error signal 15. When the motion compensation predictive signal 14*a* can reproduce the input image signal 12 successfully, as shown in the figure, according to the excellent motion detection performance, the difference or the predictive error signal 15** between the two signals is small. Consequently, this can contribute to a higher coding efficiency because the amount of coding information is reduced.

Accordingly, when a motion block of the motion compensation predictive signal has a high quality of reproduction of the input image signal with the excellent motion detection performance and the difference between the two signals is very small, the block need not to be filtered. However, this does not apply to some cases: an image signal is filtered irrespective of the reproduction quality of the motion compensation predictive signal.

When the motion compensation predictive signal 14 is filtered with the LPF, the signal loses higher frequency components as shown in FIG. 41. As a result, the difference between the input image signal and the filtered motion compensation predictive signal is the higher frequency components. In other words, a large amount of coding is needed thereby reducing the coding efficiency and resulting in a low definition.

FIGS. 43(*a*), 43(*b*) and 43(*c*) respectfully illustrate the characteristics of two input signals and one output signal at the subtractor 3. FIG. 43(*a*) shows the characteristic of the input image signal 12, which corresponds to that of FIG. 42(*a*). FIG. 43(*b*) shows the characteristic of the filtered motion compensation predictive signal **14*b* in comparison to that of the unfiltered motion compensation predictive signal 14*a*. This shows that the higher frequency components (noise) in the signal with motion is eliminated by the LPF filtering. FIG. 43**(*c*) shows the characteristic of the predictive error signal 15 which is the difference between the two input signals 12 and 14. The difference still contains the higher frequency components of the motion compensation predictive signal 14. This requires the encoder to have to encode bigger amounts of information leading to a lower coding efficiency.

Thus, the problem is stemmed from the unnecessary filtering as FIGS. 42(*a*), 42(*b*), 42(*c*), 43(*a*), 43(*b*) and 43(*c*) illustrate. The motion compensation predictive signal 14 is not to be filtered when the signal has a high quality of reproduction due to a high detection performance of motion as shown in FIGS. 42(*a*), 42(*b*) and 42(*c*). When the motion compensation predictive signal 14 is filtered unnecessarily under that condition as shown in FIGS. 43(*a*), 43(*b*) and 43(*c*) the image is damaged involving poor coding efficiency due to a higher amount of coding information or involving poor definition.

The conventional interframe coding system carries another problem of quantization. Coding performance, according to the conventional system, is based upon a limited quantization which is designed optimally for a certain pattern of predictive error signal 15. In other words, the limited quantization can not deal effectively with coding signals of various patterns. When the encoder quantizes the signal with the limited quantization, the predictive error signal 15 is characterized with a poor coding efficiency and results in producing a poor coded error signal.

The present invention is devoted to solve the problems. An objective of this invention is to provide an interframe coding system with a high coding efficiency by eliminating higher frequency components remaining in a coded signal.

Another objective of this invention is to provide a coding controller which allows the encoder to code efficiently with coding signals of various patterns. This can lead to the overall coding efficiency of the interframe coding system.

SUMMARY OF THE INVENTION

An interframe coding system according to one aspect of the present invention for frame-to-frame coding of an input signal, having a local decoding loop which includes a filter for filtering a predictive signal, may include a filter controller for receiving the input signal and the predictive signal, and for generating a control signal to control the filter.

The local decoding loop may includes decoding means for producing a previous input signal from a previous frame, a motion vector detector which receives the input signal and the previous input signal, and outputs a motion vector, and a frame memory for receiving the motion vector and the previous input signal and outputting a motion compensation predictive signal to the filter controller as the predictive signal.

The filter controller may include a difference calculator for receiving the input signal and the predictive signal, calculating a difference between the input signal and the predictive signal and outputting a difference signal, a decision unit for receiving the difference signal and the input signal, and for outputting the control signal, and wherein the filter may include a plurality of patterns of filtering coefficients and a means for selecting a pattern of filtering coefficients based on the control signal.

The decision unit may include means for calculating an activity value from the input signal, and means for normalizing the difference by the activity value and for outputting the control signal.

The decision unit may include means for receiving the predictive signal instead of the input signal, calculating an activity value from the predictive signal, and means for normalizing the difference by the activity value and for outputting the control signal.

The decision unit may include means for comparing the difference signal and a predefined value, and issuing the control signal based on a comparison result.

The filter controller may include means for calculating a characteristic of the input signal, comparing the characteristic with a predefined value, and issuing the control signal based on the comparison result.

The filter controller may include means for generating one of multiple values as the control signal to designate the pattern of filtering coefficients of the filter.

The filter may be any one of a one dimensional filtering means, a two dimensional filtering means or a three dimensional filtering means which includes time axis as the third dimension.

The filter may be placed either before or after the frame memory.

In accordance with another aspect of the invention, an interframe coding system for frame-to-frame coding of an input signal, having a local decoding loop which includes an encoder for interframe coding the input signal, decoding means for producing a decoded signal, and a frame memory which receives the decoded signal and outputs a predictive signal, may include a controller for receiving the input signal and the predictive signal from the frame memory, for calculating a difference between the input signal and the predictive signal, and for generating a coding control signal for controlling the encoder.

The controller may include a difference calculator for receiving the input signal and the predictive signal for calculating a difference between the input signal and the predictive signal and for outputting a difference signal, a pixel difference calculator for receiving the difference signal, for calculating a value of the difference per each pixel, and for outputting the difference value per each pixel to the encoder, and wherein the encoder may include means for quantizing the input signal with a step size and for changing the step size of quantization so that coding error becomes smaller than the difference value per each pixel.

The decoding loop may include a filter, and the controller may include means for generating a filter control signal to control the filter responsive to the input signal and the predictive signal.

In accordance with yet another aspect of the invention, an interframe coding system for frame-to-frame coding of an input signal, having a local decoding loop which includes an encoder for interframe coding the input signal, decoding means for producing a decoded signal, and a frame memory which receives the decoded signal and outputs a predictive signal, may include a controller for receiving at least one of the input signal and the predictive signal, calculating an activity value from the received signals, and outputting an activity signal to the encoder to control the coding therein.

In accordance with yet another aspect of the invention, an interframe coding method for frame-to-frame coding of an input signal, wherein a coding system includes a local decoding loop comprising a frame memory for receiving a decoded signal and outputting a predictive signal, a filter for receiving and filtering the predictive signal, may include the steps of:

(a) calculating the difference between the input signal and the predictive signal;

(b) deciding a filtering coefficient of the filter based on the difference; and (c) filtering the predictive signal based on the filtering coefficient.

In accordance with yet another aspect of the invention, an interframe coding method for frame-to-frame coding of an input signal, wherein a coding system includes a local decoding loop comprising an encoder for interframe coding an input signal, decoding means for producing a decoded signal, a frame memory for receiving the decoded signal and outputting a predictive signal, and a filter for receiving and filtering the predictive signal, may include the steps of:

(a) calculating a characteristic of the input signal;

(b) deciding a filtering coefficient of the filter based on the characteristic; and (c) filtering the signal based on the filtering coefficient.

In accordance with yet another aspect of the invention, an interframe coding method for frame-to-frame coding of an input signal, wherein the coding system includes a local decoding lop including an encoder for interframe coding an input signal, decoding means for producing a decoded signal, and a frame memory for receiving the decoded signal and outputting a predictive signal, may include the steps of:

(a) calculating the difference between the input signal and the predictive signal;

(b) changing a step size of quantization in the encoder responsive to the difference; and (c) coding the input signal based on the step size of quantization.

In accordance with yet another aspect of the invention, an interframe coding method for frame-to-frame coding of an input signal, wherein the coding system includes a local decoding loop including an encoder for interframe coding the input signal, decoding means for producing a decoded signal, and a frame memory for receiving the decoded signal and outputting a predictive signal, may include the steps of:

(a) providing a characteristic signal indicating relative characteristic of one of the input signal and the predictive signal;

(b) changing a step size of quantization in the encoder based on the characteristic signal; and, (c) coding the input signal based on the step size of quantization.

In accordance with yet another aspect of the invention, a coding system which includes an encoder for coding an input signal into a coded signal and a frame memory for outputting a predictive signal, may include a coding controller responsive to the input signal and the predictive signal, for generating a coding control signal for controlling the encoder.

The coding controller may include means for interframe coding which produces an interframe signal, means for intraframe coding which produces an intraframe signal, means for determining characteristics of the interframe signal and the intraframe signal, means for comparing the two characteristics, and means for generating the coding control signal based on the comparison result.

The comparing means may include means for weighting at least one of characteristics.

The coding system may further include a filter for receiving and filtering the predictive signal, and outputting a filtered signal, and a filter controller responsive to the input signal and the predictive signal for generating a filter control signal to control the filter.

The coding controller may include means for interframe coding which produces a first interframe signal based on the filtered signal and a second interframe signal based on the unfiltered predictive signal, means for intraframe coding which produces an intraframe signal, means for determining characteristics of the first and second interframe signals and the intraframe signal, means for comparing any two of the characteristic of the first interframe signal, the characteristic of the second interframe signal, and the characteristic of the intraframe signal, and means for generating the coding control signal based on the comparison result.

The comparing means may include means for weighting at least one of characteristics.

The coding controller may include means for interframe coding which produces an interframe signal based on the filtered signal, means for intraframe coding which produces an intraframe signal, means for determining a characteristic of the interframe signal and a characteristic of the intraframe signal, means for comparing the two characteristics, and means for generating the coding control signal based on the comparison result.

The comparing means may include means for weighting at least one of characteristics.

The coding controller may include means for generating the coding control signal based on the coded signal, forming a feed back loop.

The coding controller may include means for calculating a signal characteristic based on a difference between the maximum and minimum values of luminance intensity of pixels of the input signal, on the sum of the absolute difference values between the mean value of luminance intensity of the pixels and the individual values, or on the sum of the squared difference values between the mean value of luminance intensity of the pixels and the individual values.

BRIEF DESCRIPTION OF THE DRAWINGS

FIGS. 3(*a*), 3(*b*), 3(*c*) and 3(*d*) show explanation diagrams of a block of pixels and equations of difference calculation according to the embodiment in reference to FIG. 1.

FIGS. 11(*a*), 11(*b*), 11(*c*) and 11(*d*) are explanation diagrams of an operation of an adaptive filter in FIG. 1;

FIG. 12 is an explanation diagram of filtering characteristics of an image signal according to the embodiment with reference to FIG. 1;

FIG. 31 shows a memory table of the control signal generator according to the embodiment.

DESCRIPTION OF THE PREFERRED EMBODIMENTS

Embodiment 1

Figure 1:
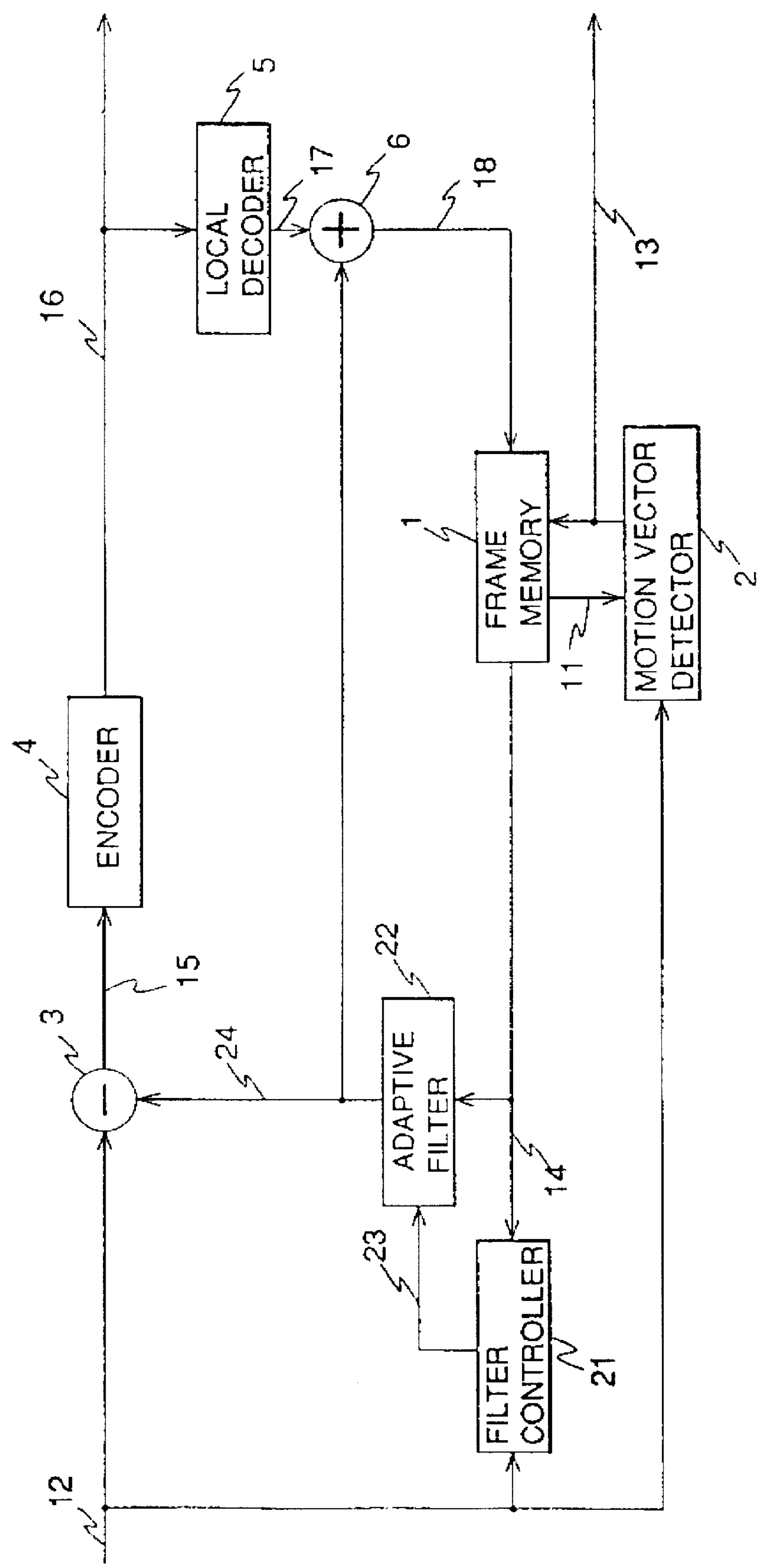
FIG. 1 shows a block diagram illustrating a configuration of an interframe coding system according to an embodiment of the present invention.
Figure 40:
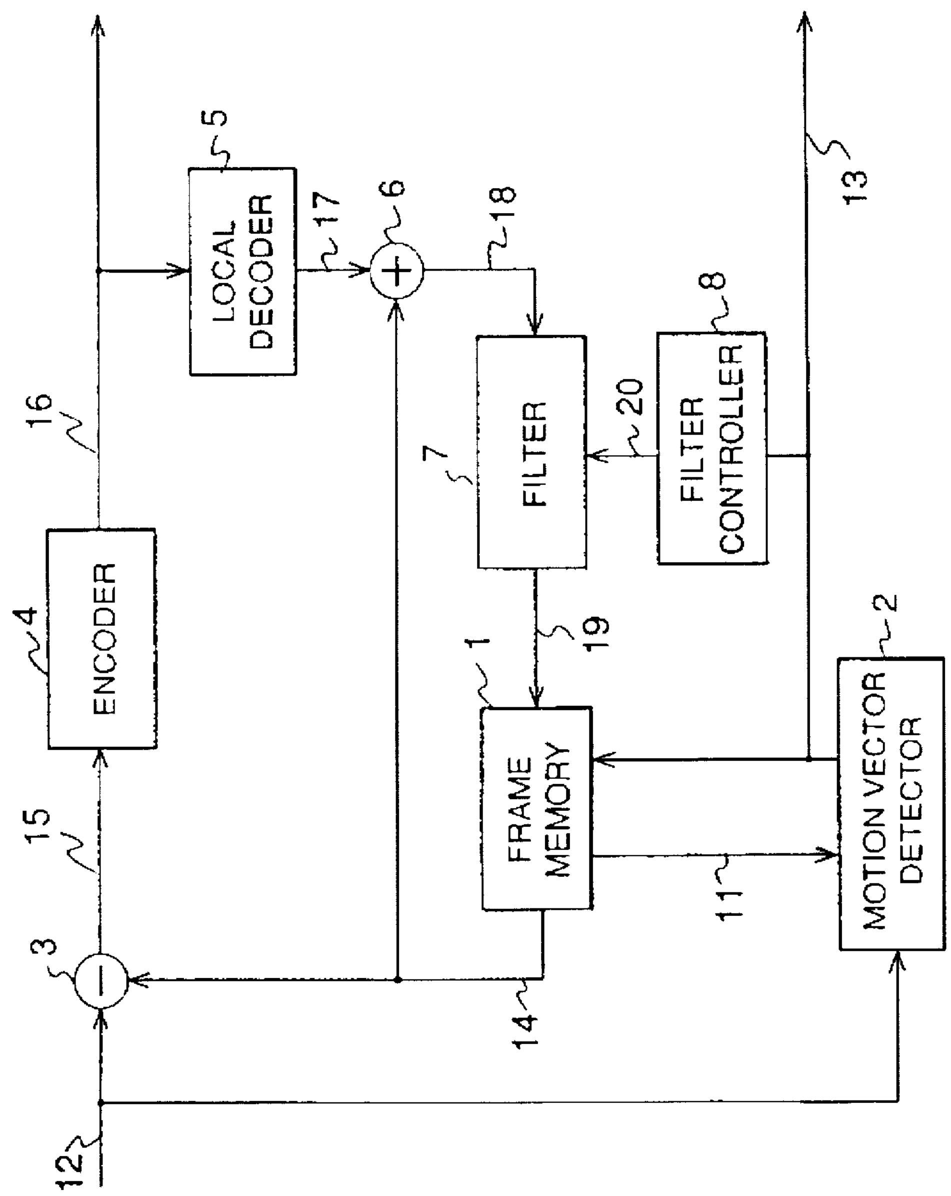
FIG. 40 shows a block diagram of a conventional configuration of an interframe coding system.
Figure 41:
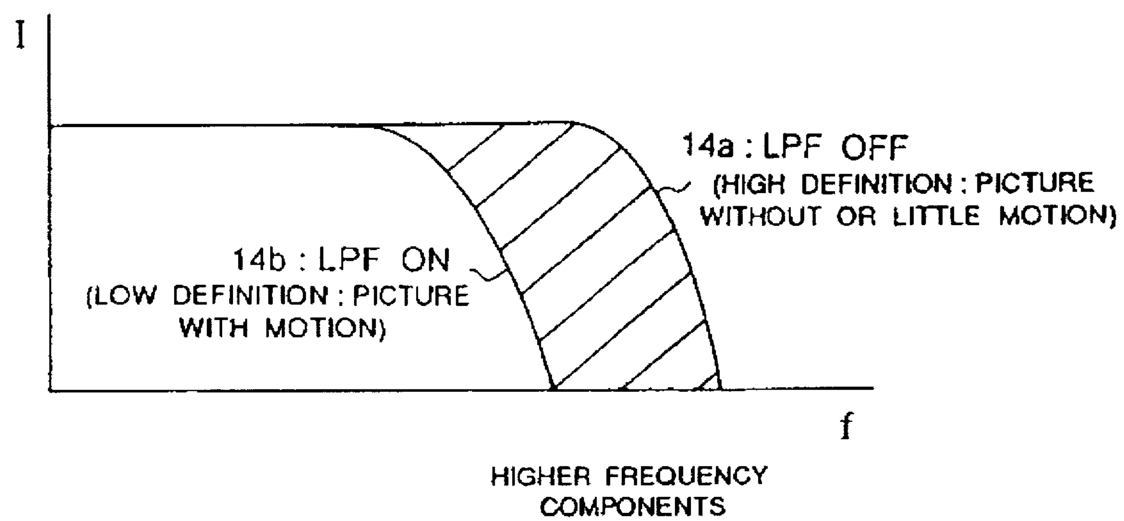
FIG. 41 shows basic characteristics of LPF filtering according to the conventional art.
Figure 42A:
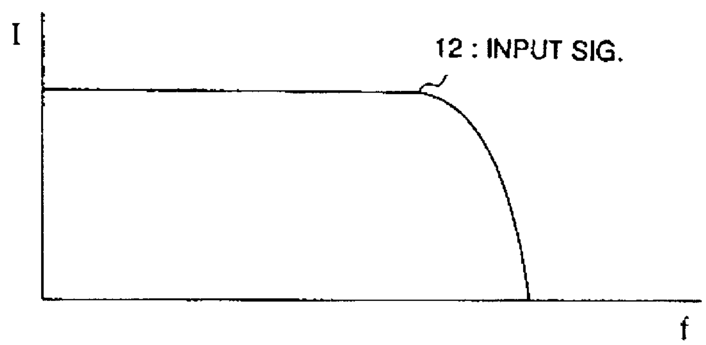
FIGS. 42(*a*), 42(*b*) and 42(*c*) show a characteristic pattern of LPF filtering according to the conventional art; and, FIGS. 43(*a*), 43(*b*) and 43(*c*) show another characteristic pattern of LPF filtering according to the conventional art.
Figure 42B:
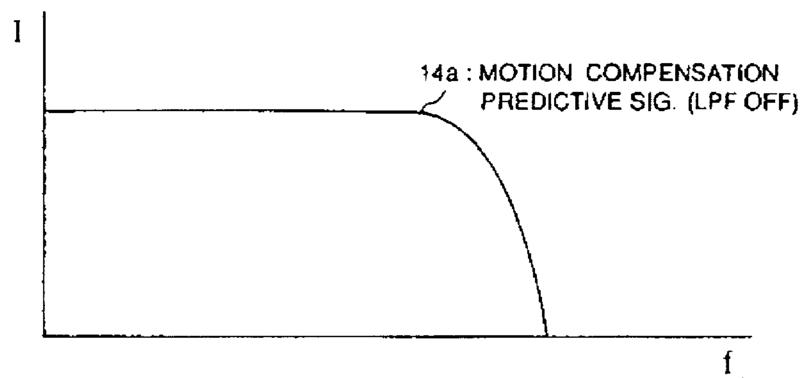
Figure 42C:
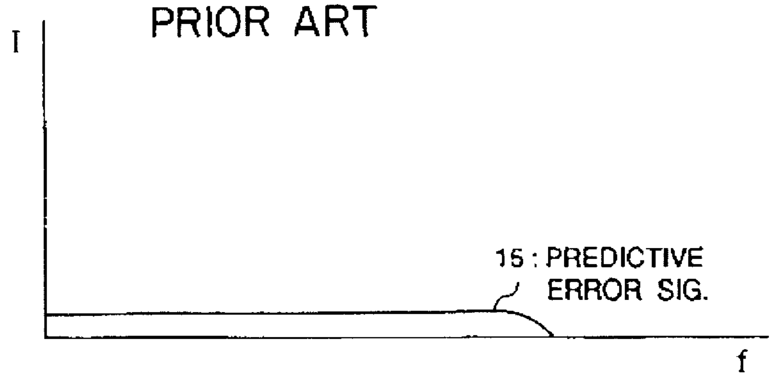
Figure 43A:
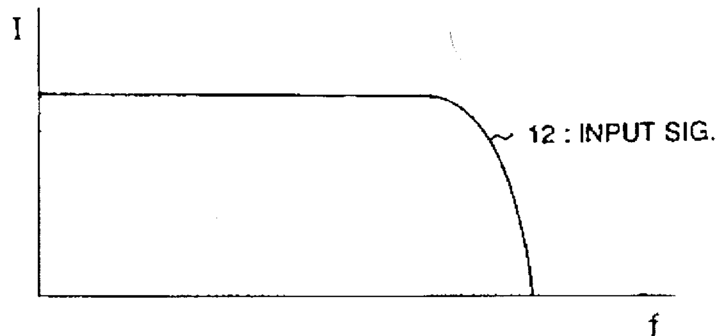
Figure 43B:
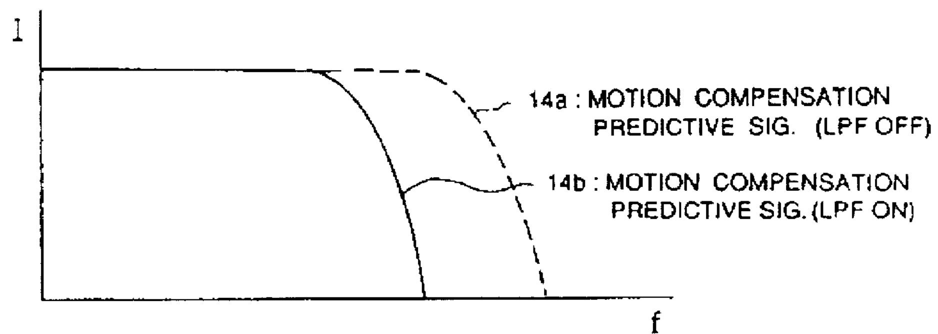
Figure 43C:
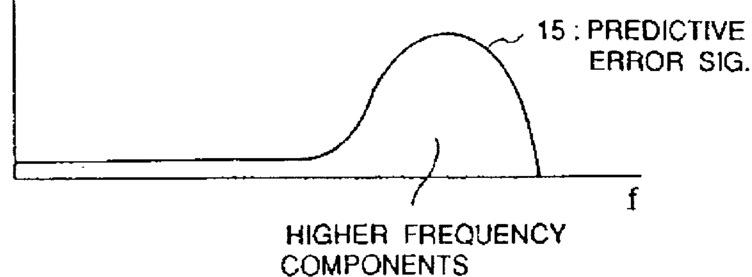

FIG. 1 shows an interframe coding system in accordance with an embodiment of the present invention. FIG. 1 comprises FIG. 40 of the conventional art, as modified by adding a filter controller 21 and an adaptive filter 22 and by removing the filter 7 and the filter controller 8 instead. The interframe coding system processes an image by a processing unit or block of 8×8 pixels according to this embodiment.

Operation of the interframe coding system with a local decoding loop according to this embodiment is now described with reference to FIG. 1.

An input image signal 12 is processed in a motion vector detector 2 with an image signal 11 of the previous frame stored in the frame memory 1 to detect a motion vector. The frame memory generates a motion compensation predictive signal 14 based upon a motion vector signal 13. The interframe coding process corresponds so far to that of the conventional art. The motion compensation predictive signal 14 is input in the filter controller 21 together with the input image signal 12. The filter controller 21 generates a filter control signal 23.

Operation of the filter controller 21 according to this embodiment is now described with reference to FIGS. 1 through 5.

Figure 2:
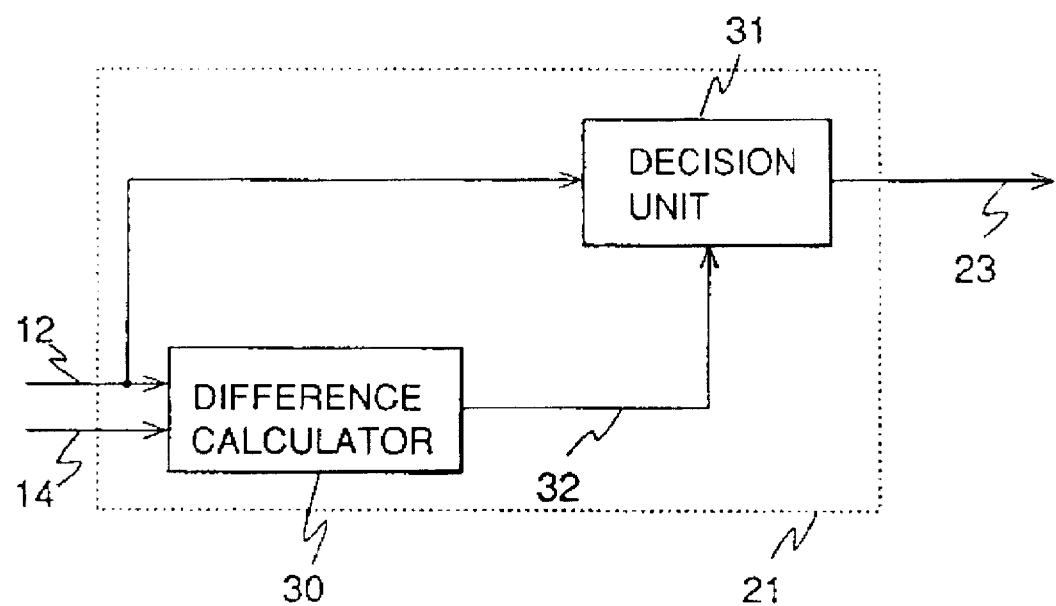
FIG. 2 shows a block diagram of a configuration of a filter controller in FIG. 1.

FIG. 2 shows a configuration of the filter controller 21 in FIG. 1 which includes a difference calculator 30, a decision unit 31 and a difference signal 32. The difference calculator 30 basically calculates a difference between the input image signal 12 and the motion compensation predictive signal 14 to output the difference signal 32. Specifically, the difference signal 32 is output in the following process: the difference calculator 30 calculates an absolute difference or squared difference between the signals for each pixel. Then the absolute values or squared values of pixel differences are calculated for the processing unit or a block of 8×8 (64) pixels and output as the difference signal 32.

FIGS. 3(*a*), 3(*b*), 3(*c*) and 3(*d*) show explanation diagrams and equations of difference calculation for the difference signal 32. FIGS. 3(*a*) and 3(*b*) show a block or processing unit of 8×8 pixels of an image signal, respectively. FIG. 3(*a*) shows 64 pixels in a block of the input image signal 12 with each pixel represented by S1 through S64. FIG. 3(*b*) shows 64 pixels in a block of the motion compensation predictive signal 14 with each pixel represented by Y1 through Y64. FIGS. 3(*c*) and 3(*d*) represent possible forms of difference calculations of a luminance intensity of the pixels between the input image signal 12 and the motion compensation predictive signal 14 for the difference signal 32. Difference signal N in FIG. 3(*c*) is the sum of the absolute difference between the signals, while difference signal N in FIG. 3(*d*) is the sum of the squared difference between the signals.

The value of the difference signal 32 becomes smaller when the predictive signal accurately predicts performance of the system. The value becomes larger, on the other hand, for the following possible cases:

(a) for a poor predictive signal resulting from a poor prediction performance of the system;

(b) where the input image signal has varied significantly from the previous image signal; and, (c) for a poor predictive signal resulting from a poor quality of the local decoded signal held in the frame memory 1 containing a large amount of quantization errors.

The decision unit 31 calculates an "Activity" of the block of pixels of the input image signal 12 responsive to the difference signal 32. The "Activity" is based upon the difference, for instance, between the maximum and minimum values of the input image signal 12 as shown in FIG. 4.

Figure 4:
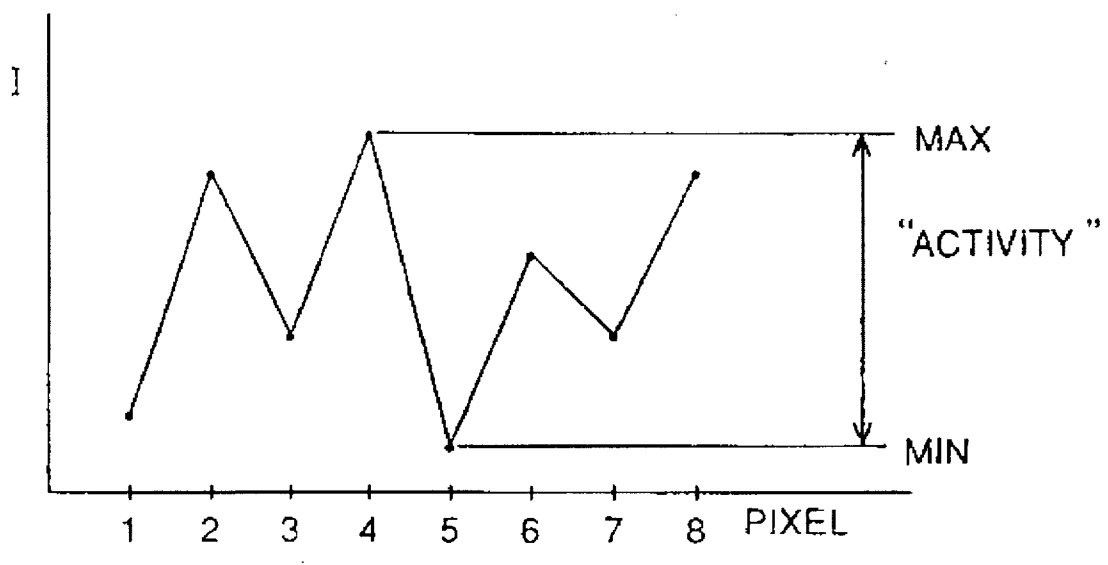
FIG. 4 is an explanation diagram of the "Activity" of an image signal according to the embodiment with reference to FIG. 1.

FIG. 4 is an explanation diagram of the "Activity" illustrating that the "Activity" is based upon the difference between the maximum and minimum values of luminance intensity of pixels of the input image signal 12. The figure offers a brief explanation of the "Activity" by using only eight pixels instead of 64 pixels. The "Activity" of an image signal according to the figure is the difference value between the values of luminance intensity of the fourth pixel (maximum intensity) and of the fifth pixel (minimum intensity) in the eight pixels of the image signal.

Figure 5A:
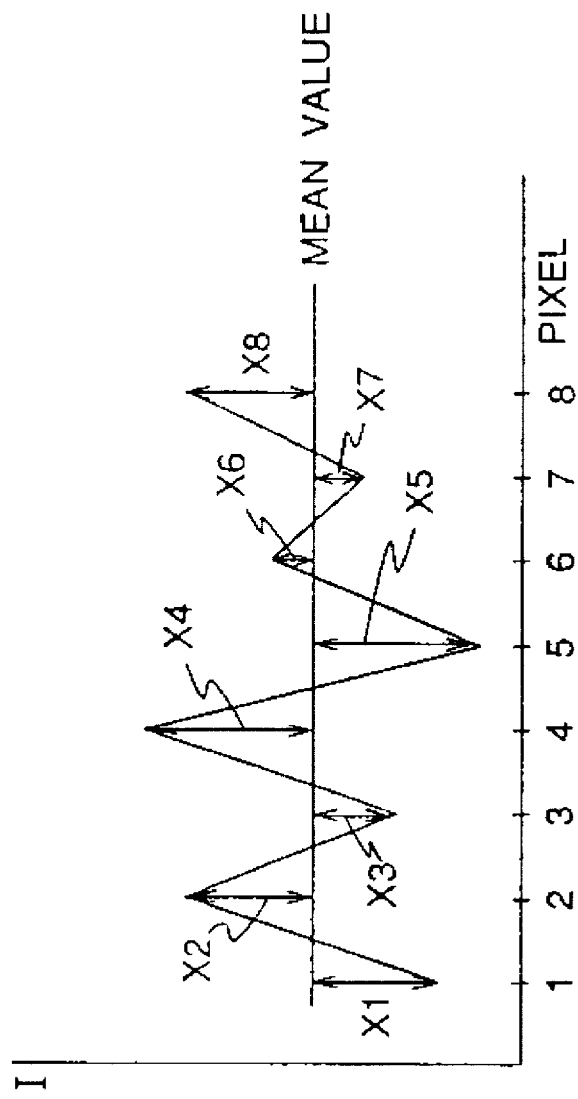
FIGS. 5(*a*), 5(*b*), and 5(*c*) show explanation diagrams of the "Activity" of an image signal according to the embodiment with reference to FIG. 1.

FIGS. 5(*a*), 5(*b*) and 5(*c*) show another example of calculating the "Activity" of the image signal which can be either the sum of the absolute or squared difference values between the mean value of luminance intensity of the pixels and the individual values.

FIG. 5(*a*) illustrates the "Activity" calculation of the mean value of luminance intensity of the pixels of the image signal. X1 through X8 in the diagram show the difference between the luminance intensity of the pixel and the mean value of luminance intensity of the eight pixels. FIG. 5(*b*) shows one of the calculation formulas of "Activity" X which is the sum of the absolute difference values of X1 through X8. FIG. 5(*c*) shows another calculation formula of "Activity" X which is the sum of the squared difference values of X1 through X8.

The "Activity" denotes, as shown in FIGS. 4 and 5, nothing like an absolute intensity but a relative value of an image signal.

Specifically, "Activity" X becomes smaller with an image signal containing a large amount of lower frequency components, "Activity" X becomes larger with an image signal containing a large amount of higher frequency components.

The difference signal 32 is normalized or divided by the "Activity" of the image signal in the decision unit 31. A normalized result or value decides filtering intensity for eliminating higher frequency components in the image signal. The decision unit 31 generates the filter control signal 23 specifying filtering intensity according to a normalized result. Specifically, when a normalized value is larger, indicating that the image signal contains a great amount of higher frequency components, the image signal is filtered with higher filtering intensity. When a normalized value is smaller, on the other hand, indicating that the signal contains a large amount of lower frequency components, the image signal is filtered with lower filtering intensity. The decision unit 31 provides multiple values to the adaptive filter 22 for modifying the filtering intensity of the filter. The filter control signal 23 specifies filtering intensity of the image signal using one of the multiple values according to a normalized result.

The decision unit 31 according to this embodiment provides two values, for a brief explanation, indicating ON and OFF for controlling the filter with the filter control signal 23. In this case, a threshold value is to be set as a threshold for deciding whether the image signal is to be filtered or not. When a normalized value is larger than the threshold, the signal is to be filtered for eliminating higher frequency components and consequently reducing the amount of coding information. When a normalized value is smaller, on the other hand, than the threshold, the image signal is unfiltered in order to keep its original definition.

Figure 6:
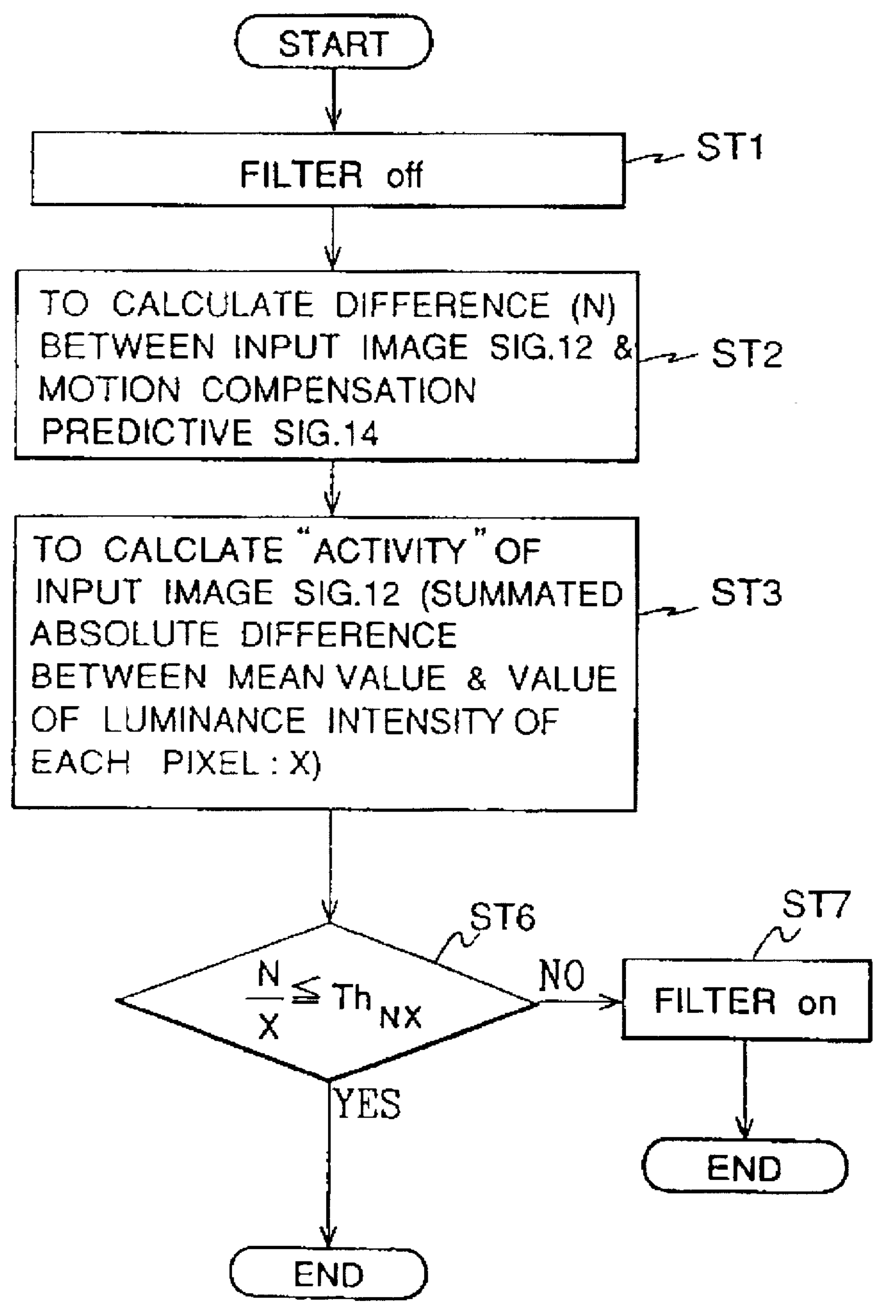
FIG. 6 shows a flowchart of filtering control operation according to the embodiment in reference to FIG. 1.

FIG. 6 shows a flowchart of filtering control in the filter controller 21 controlling the filter operation (ON/OFF) with the motion compensation predictive signal.

The filter controller 21 controls filtering based upon data from the input image signal 12 and the motion compensation predictive signal 14.

The following is the operating sequences of filtering control with an image signal:

ST1. The adaptive filter is set OFF as an initial value.

ST2. The difference calculator 30 calculates the difference N between the input image signal 12 and the motion compensation predictive signal 14.

ST3. The decision unit 31 calculates the "Activity" of the input image signal 12.

ST6. The decision unit 31 normalizes or divides the difference N by the "Activity" X of the input image signal.

When a result of ST6 is smaller than a threshold value $Th_{NX}$, indicating a successful prediction of an image signal, the motion compensation predictive signal is not to be filtered and the filter remains OFF. This indicates that difference N is smaller or "Activity" X is larger. In other words, the motion compensation predictive signal with a smaller value of difference N has reproduced the image successfully and therefore does not need to be filtered. On the other hand, the motion compensation predictive signal with a larger value of "Activity" X can indicate that the motion compensation predictive signal 14 contains a large amount of higher frequency components due to the original input image signal containing a large amount of higher frequency components. The motion compensation predictive signal, in this case, is not to be filtered.

When a result of ST6 is larger than a threshold value $T_{NX}$, indicating a poor prediction of the image, the motion compensation predictive signal is to be filtered and the filter is turned ON. This indicates that the difference N is larger or that the "Activity" X is smaller. In other words, the motion compensation predictive signal with a larger value of the difference N due to a poor prediction, thus containing a large amount of higher frequency components. Therefore the motion compensation predictive signal, in this case, should be filtered in order to eliminate the higher frequency components for a highly efficient coding. On the other hand, the motion compensation predictive signal with a smaller value of the "Activity" X is also to be filtered. However, there is a situation when the motion compensation predictive signal with a larger value of "Activity" X is not to be filtered. It is often the case when "Activity" X is larger, the motion compensation predictive signal 14 contains a large amount of higher frequency components. In this case the motion compensation predictive signal is not to be filtered keeping the higher frequency components with it, which can achieve a higher coding efficiency.

Figure 7:
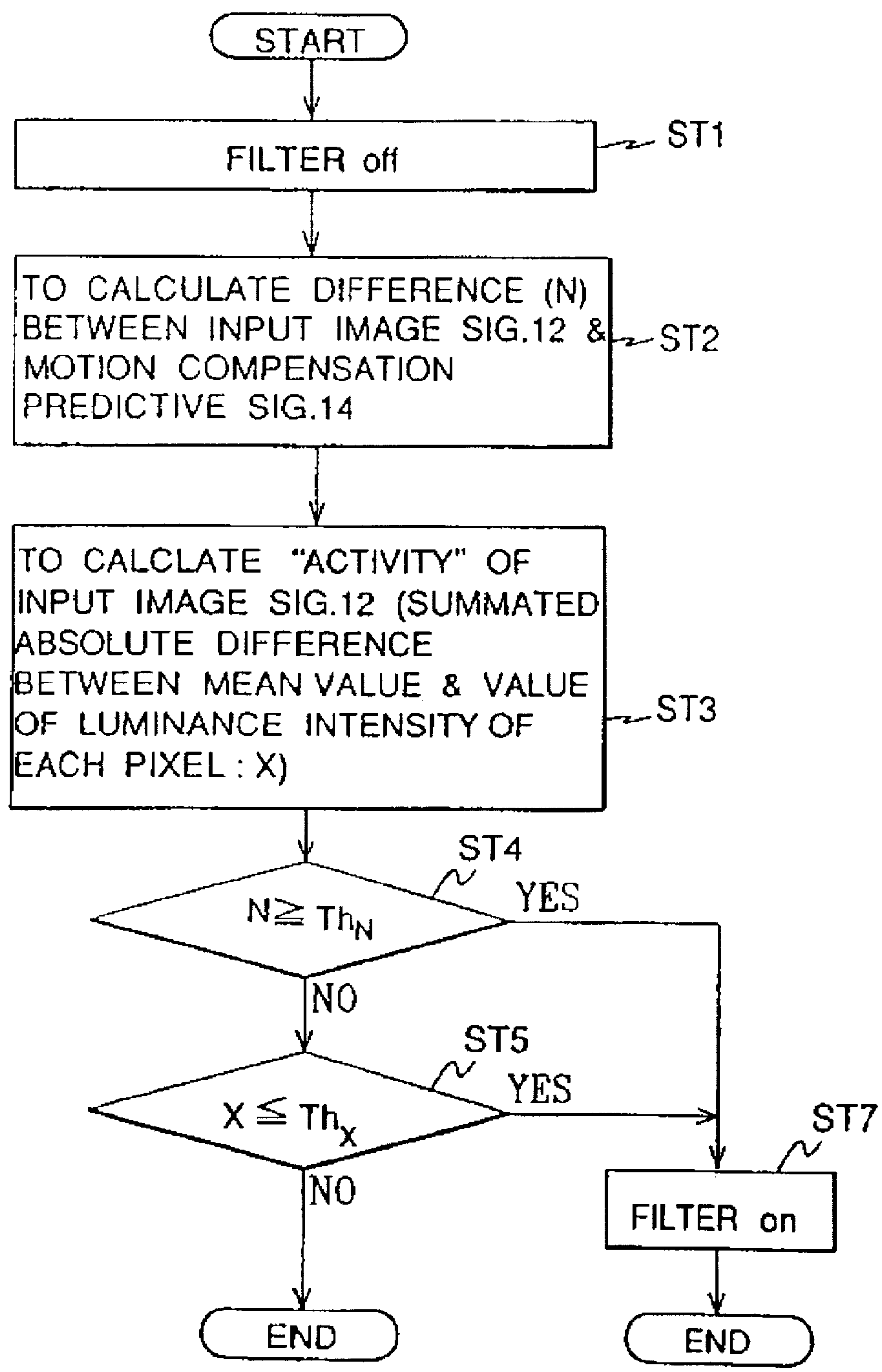
FIG. 7 shows a flowchart of another filtering control operation according to the embodiment.

FIG. 7 shows a flowchart of another filtering control method accomplished in the filter controller 21.

As ST4 in the figure shows, when difference N is larger than a first threshold value $Th_N$, the filter is turned ON. This means that the motion compensation predictive signal contains a large amount of higher frequency components and therefore is to be filtered in order to eliminate the higher frequency components to improve the coding efficiency.

As ST5 in the figure shows, when "Activity" X is smaller than a second threshold value $Th_X$, the filter is turned ON. This indicates that the input image signal 12 contains almost no higher frequency components. In other words, the motion compensation predictive signal with less or no higher frequency components cannot be influenced by filtering in terms of the elimination of higher frequency components and can still have more effective result with filtering rather than without filtering in terms of the elimination of noise. On the other hand, when "Activity" X is larger than a threshold value $Th_X$, the filter is not used (OFF). This indicates that the input image signal 12 contains a large amount of higher frequency components and, consequently, the motion compensation predictive signal 14 also contains a large amount of higher frequency components. In this case the motion compensation predictive signal 14 remains unfiltered keeping higher frequency components with it.

Figure 8:
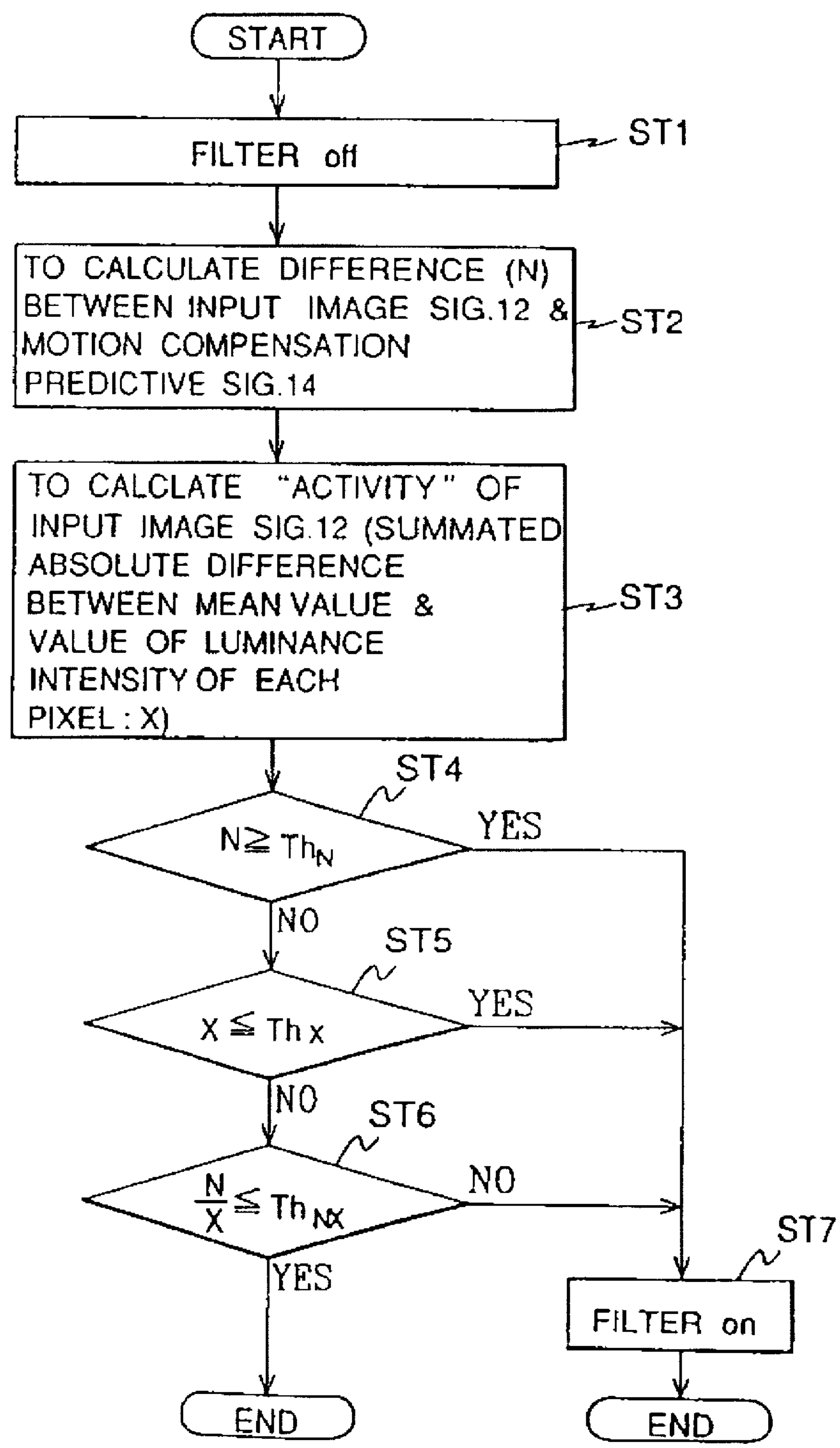
FIG. 8 shows a flowchart of another filtering control operation according to the embodiment.

FIG. 8 shows a flowchart of another filtering control method which can be executed in the filter controller 21. FIG. 8 is a combination of FIGS. 6 and 7. The combination brings about a more adaptive control of filtering the image signal with many choices of threshold values available.

With further reference to the embodiment, filtering control in accordance with the invention can be operated based on the comparison between the "Activity" of the input image signal and a threshold value $Th_X$. In other words, the flowchart in FIG. 7 can be altered by omitting the difference calculation step ST2 and the comparison step ST4 between N and $Th_X$.

When a division is operated by zero, the quotient is generally supposed to be infinite. This theory, however, does not apply to normalization here, for the calculation is generally with a finite length word. In other words, when a difference results from the difference calculator 30 is normalized by zero at ST6 in FIG. 6, a value of the "Activity", the quotient or normalized result is considered the maximum value of the finite word used. Accordingly, when normalization uses an eight-bit operation, the quotient is "FF", which is the maximum value of an eight-bit word, which is the maximum normalized value.

Figure 9A:
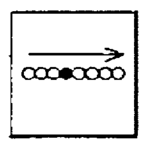
FIGS. 9(*a*), 9(*b*) and 9(*c*) are explanation diagrams of different filtering techniques of one-, two-, and three-dimensions according to the embodiment with reference to FIG. 1.
Figure 9B:
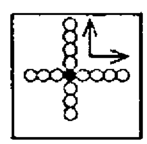
Figure 9C:
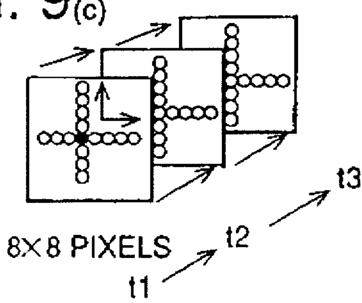

The adaptive filter 22 filters the motion compensation predictive signal 14 according to the filter control signal 23 for eliminating higher frequency components in the signal. As shown in FIG. 9, the adaptive filter 22 can provide a multi-dimensional filtering including one-, two- and three-dimensional filters. The three-dimensional filter can change the filtering coefficient based upon the motion in an image signal as the frame varies with time. Filtering intensity of the adaptive filter can be varied according to the filtering coefficient specified by the filter control signal 23.

FIGS. 9(*a*), 9(*b*) and 9(*c*) multi-dimensional low-pass filtering of the adaptive filter 22. FIG. 9(*a*) shows a one dimensional filtering of a line of pixels having a processing pixel as shown by a black dot in the processing unit or block of pixels. FIG. 9(*b*) shows horizontal and vertical lines of pixels in the block, and illustrates a two-dimensional filtering. FIG. 9(*c*) shows horizontal and vertical lines of pixels in blocks of time-varying frames t1, t2 and t3, thereby illustrating a three-dimensional filtering.

Black dots in FIG. 9 indicate processing pixels. A processing pixel can be filtered with the influence of the neighboring pixels according to any of the one-, two- , and three-dimensional filtering techniques.

Figure 10:
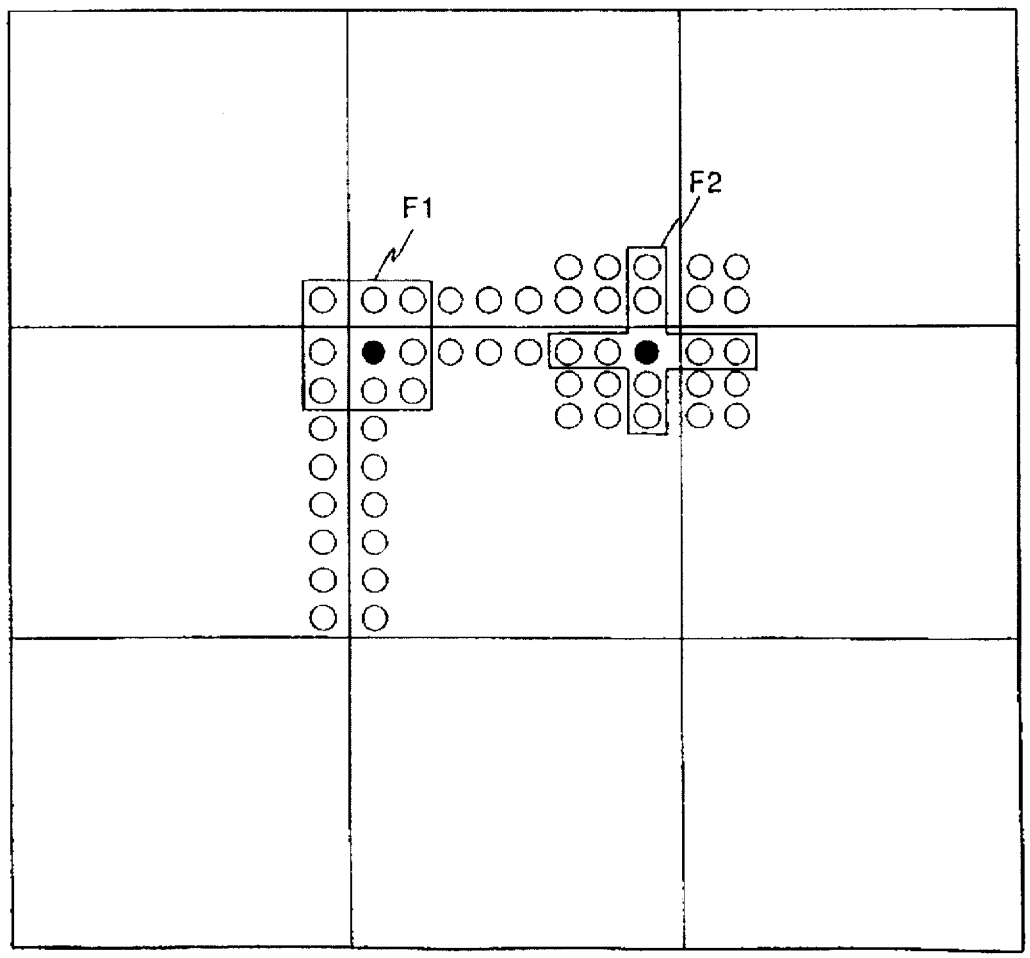
FIG. 10 is an explanation diagram of intra- and inter-block filtering techniques according to the embodiment with reference to FIG. 1.

An image signal can be filtered either by a intrablock filtering, or by using pixels within the processing unit or block of 8×8 pixels exclusively, or by a interblock filtering, or by using pixels in the neighboring blocks comprehensively as FIG. 10 shows.

FIG. 10 illustrates examples of the inter-block filtering with the processing pixel in a black dot. F1 and F2 in the figure show, respectively, the inter-block filtering of the processing pixel by using pixels in the neighboring blocks.

FIGS. 11(*a*), 11(*b*), 11(*c*) and 11(*d*) are explanation diagrams illustrating a one-dimensional filtering.

FIG. 11(*a*) shows five pixels, S1 through S5, for a one-dimensional filter, including a black dot, S3, as the processing pixel. K1 through K5 in the figure indicate filtering coefficients for each corresponding pixels S1 through S5 in the figure. The sum of the coefficients is 1.0 as shown in FIG. 11(*b*).

Filtering intensity for the processing pixel is specified or decided by the result of the following calculation: the luminance intensity of each pixel of the processing pixel and the neighboring pixels S1 through S5 is multiplied by a group of corresponding filtering coefficients k1 through K5. Each result of the multiplication is summed up. FIGS. 11(*c*) and 11(*d*) show different patterns of filtering coefficients K1 through K5 for the multiplication under the condition that the sum of the coefficients is 1.0. When the value of filtering coefficient of the processing pixel is not 1.0 (K3=0.6) or those of the neighboring pixels are non-zero (K1=K2=K4=K5=0.1) as shown in FIG. 11(*c*), the luminance intensity of the processing pixel is influenced by those of the neighboring pixels to be normalized. When the value of filtering coefficient of the processing pixel is 1.0 (K3=1.0) or those of the neighboring pixels are zero (K1,K2,K4,K5=0.0) as shown in FIG. 11(*d*), the luminance intensity of the processing pixel has no influence by those of the neighboring pixels keeping its original luminance intensity. This indicates that the processing pixel is not to be filtered or the low-pass filter is to be OFF.

FIG. 12 is an explanation diagram illustrating different characteristics of the predictive signal 24 by different degrees of filtering intensity with different filtering coefficients. The filter control signal 23 specifies the optimal filtering intensity for the motion compensation predictive signal 14 to eliminate higher frequency components in the signal in a multiphase manner with multiple choices of the pattern of filtering coefficients. The four characteristic of the prediction signal, 24*a* through 24*b*, in the figure indicate different filtering results by multiphase elimination of higher frequency components in the signal with different patterns of filtering coefficients. Characteristic 24*a* shows that the motion compensation predictive signal 14 is not filtered containing a great amount of higher frequency components. Characteristic 24*d* shows that the motion compensation predictive signal 14 is filtered containing a large amount of lower frequency components with very small portion of or no higher frequency components. The characteristics of the signal can be changed with different filtering coefficients from 24*a* to 24*d* as an arrow A indicates if the predictive signal contains a large amount of higher frequency components. As an arrow B indicates, the characteristic can be changed from 24*d* to 24*a* with different filtering coefficient if the signal requires higher definition. Generally, an image signal can keep its original resolution, its highest definition, without filtering.

When filtered the predictive signal 24 is subtracted from the input image signal 12 in a subtractor 3, where a predictive error signal 15 is output. The predictive error signal 15 is coded by quantization in an encoder 4, where a coded error signal 16 is output. The coded error signal 16 is decoded in a local decoder 5, where a local decoded error signal 17 is output. The local decoded error signal 17 is added to the predictive signal 24 in an adder 6, where a local decoded signal 18 is output. The local decoded signal is stored or written in the frame memory 1.

Embodiment 2

Figure 13:
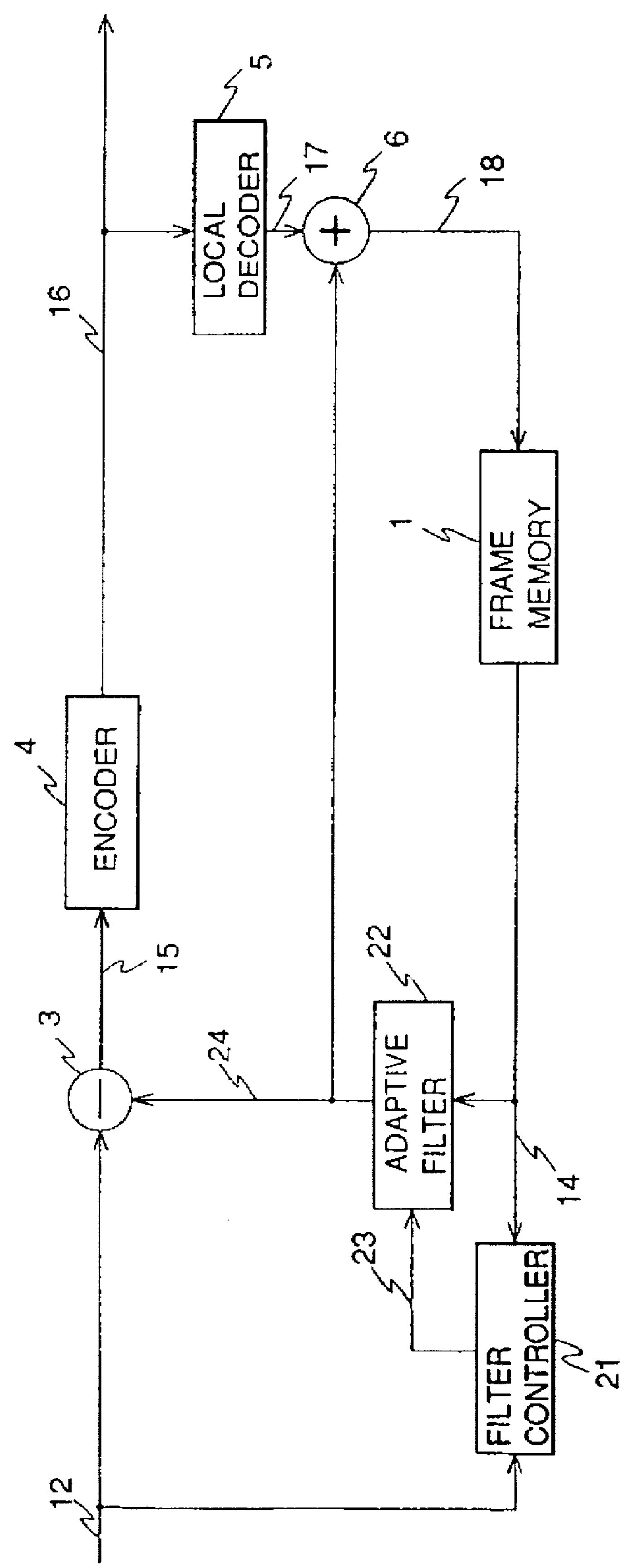
FIG. 13 shows a block diagram illustrating a configuration of an interframe coding system according to another embodiment of the present invention.

With further reference to FIG. 1, the interframe coding system in accordance with the invention can omit the motion vector detector 2 in terms of simplification of the system as shown in FIG. 13. In this case, the quantity of motion of an image signal is to be considered zero.

Embodiment 3

Figure 14:
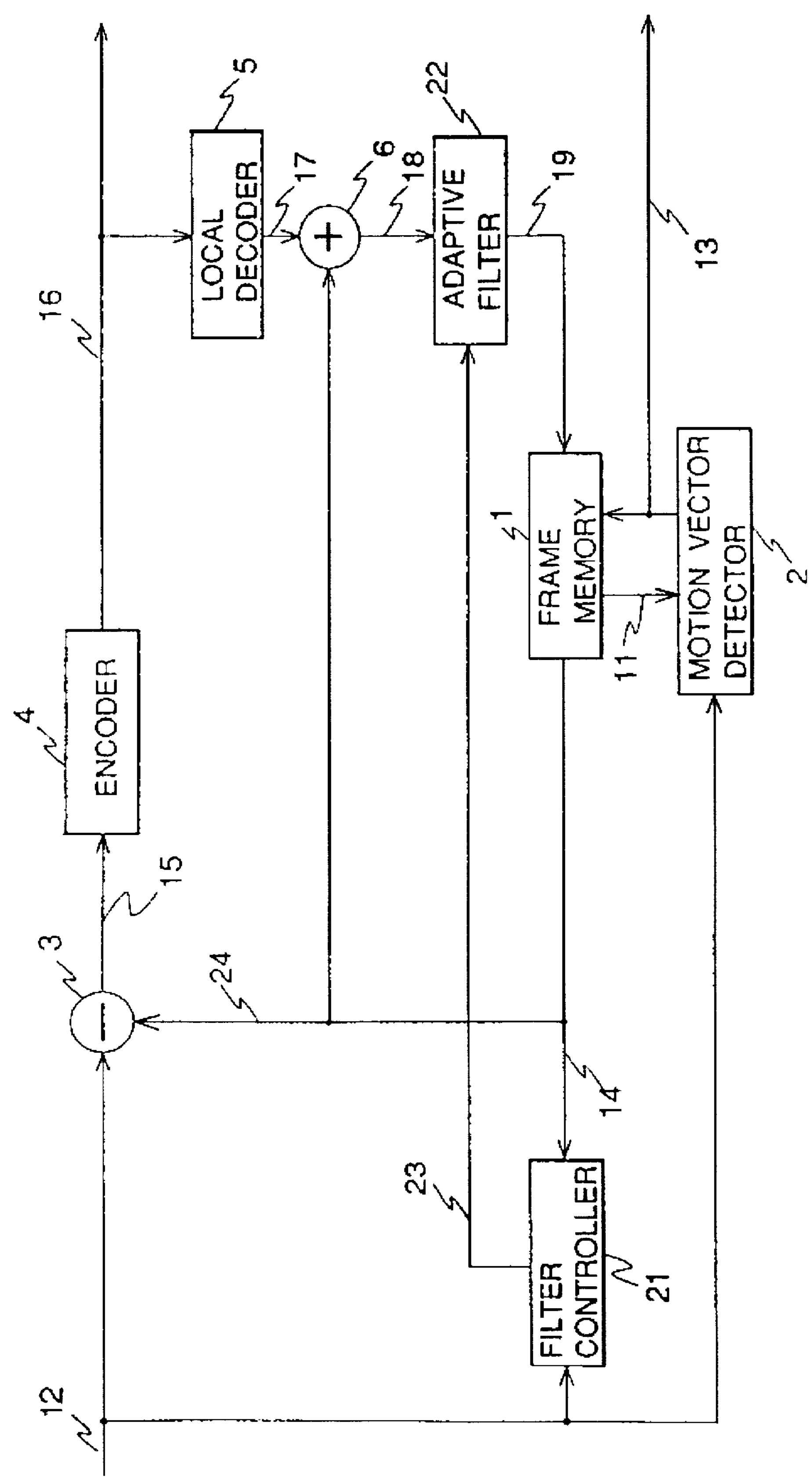
FIG. 14 shows a block diagram illustrating a configuration of an interframe coding system according to another embodiment of the present invention.

With further reference to FIG. 1, the interframe coding system in accordance with the invention can provide the adaptive filter 22 after the adder 6 in the local decoding loop instead of being after the frame memory 1, as is shown in FIG. 14.

Embodiment 4

Figure 15:
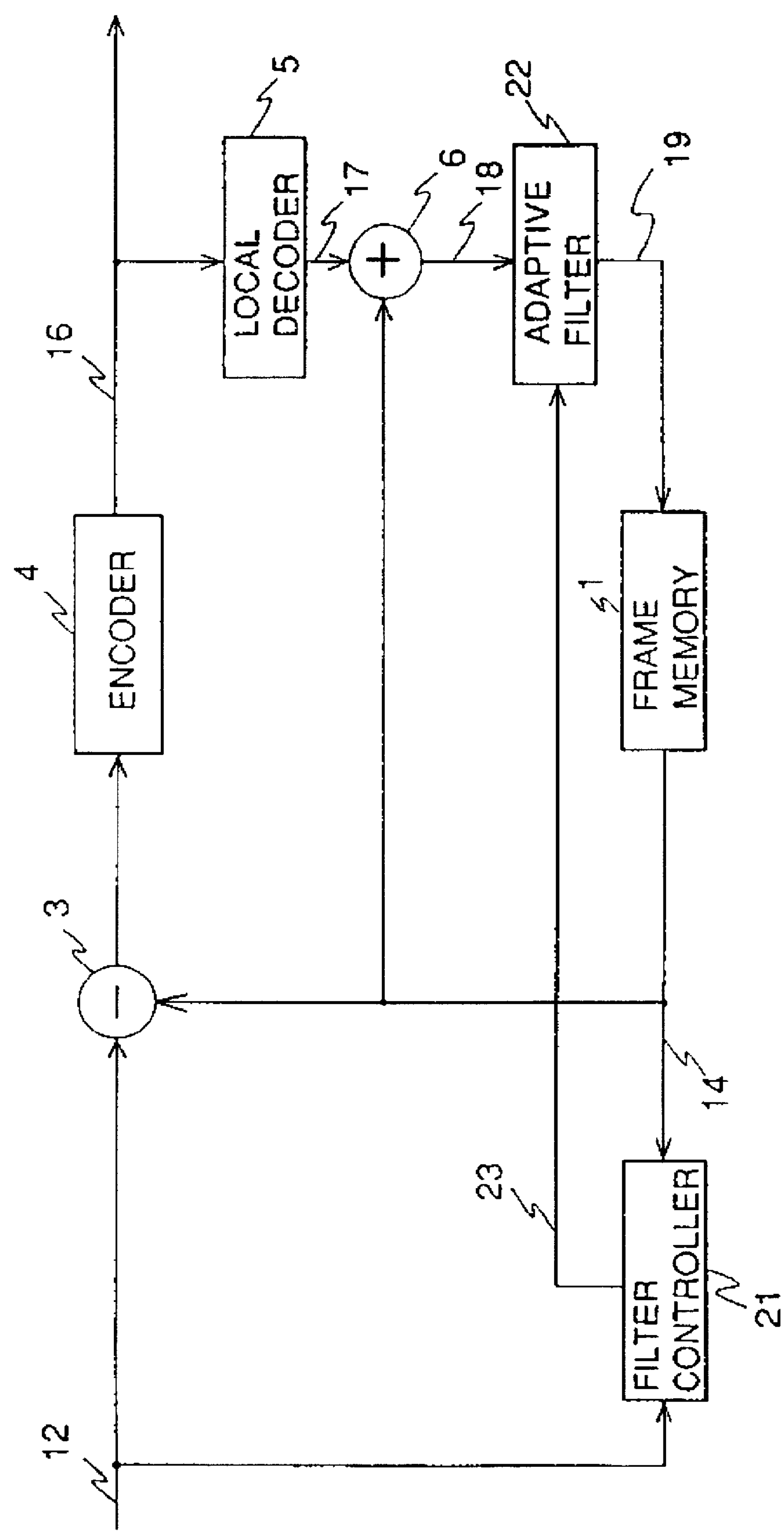
FIG. 15 shows a block diagram illustrating a configuration of an interframe coding system according to another embodiment of the present invention.

With further reference to FIG. 1, the interframe coding system in accordance with the invention can combine the previous two embodiments. The interframe coding system omits the motion vector detector 2 and provides the adaptive filter 22 after the adder 6 in the local decoding loop instead of being after the frame memory 1, as is shown in FIG. 15. In FIG. 15 the motion vector detector 2 is not provided. Therefore, the interframe coding system with this configuration operates under the condition that the quantity of motion of an image signal is zero.

Embodiment 5

Figure 16:
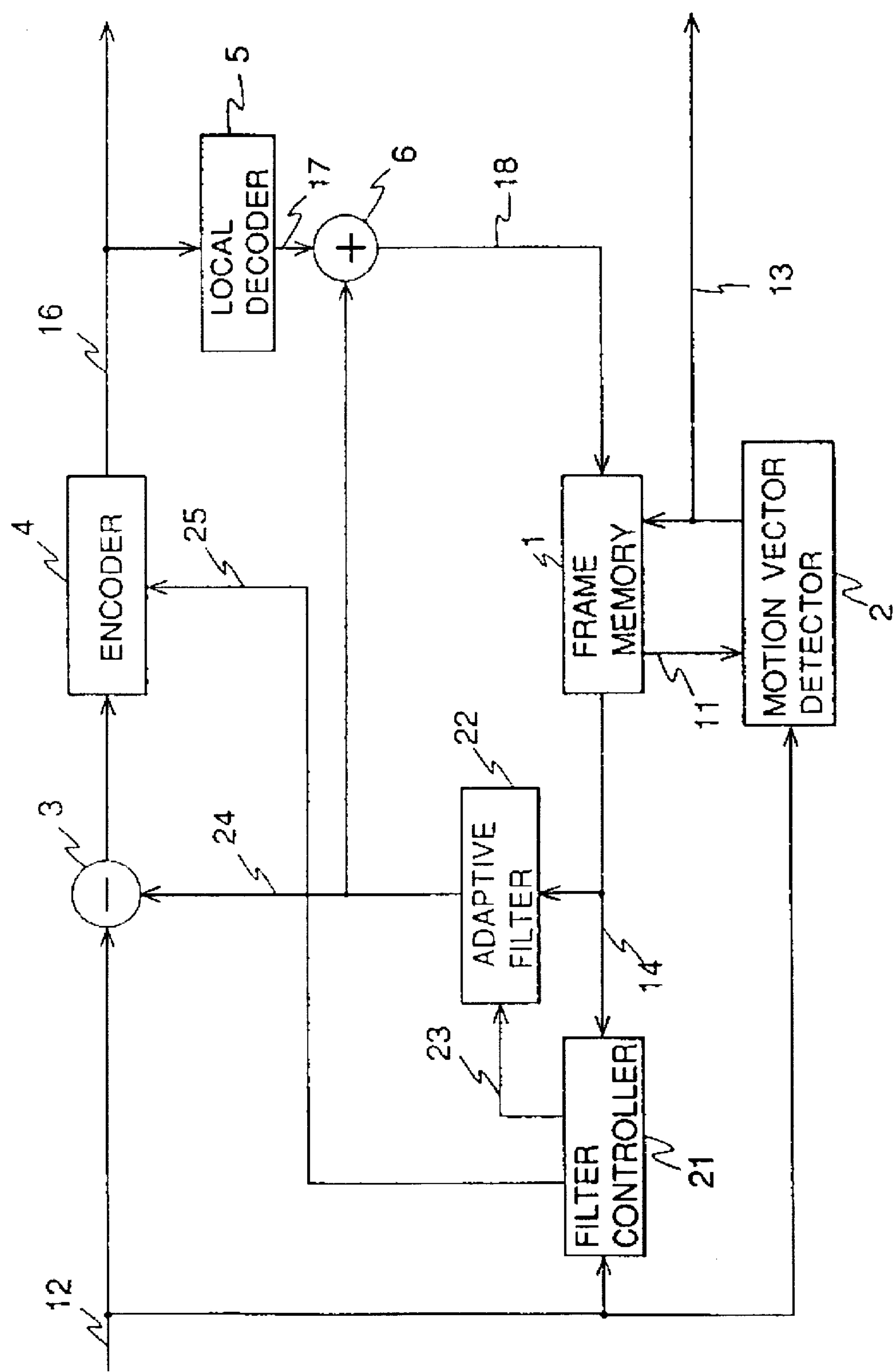
FIG. 16 shows a block diagram illustrating a configuration of an interframe coding system according to another embodiment of the present invention.

FIG. 16 shows another configuration of the interframe coding system in accordance with the invention. The filter controller 21 outputs a pixel difference signal 25 or a control signal to the encoder 4 as well as the filter control signal 23 to the adaptive filter 22. The pixel difference signal 25 is the difference per pixel which is calculated by dividing the value of the difference signal 32 by the number of pixels in a block of pixels (e.g. 8×8=64) in the filter controller 21.

Figure 17:
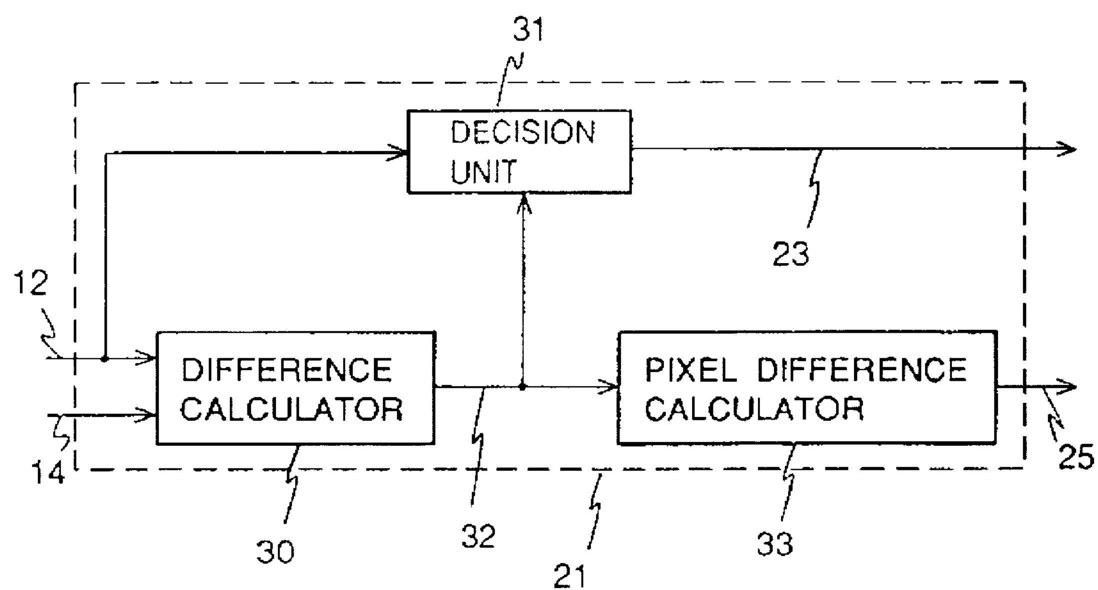
FIG. 17 shows a block diagram of a configuration of a filter controller according to the embodiment with reference to FIG. 16.

FIG. 17 shows a configuration of the filter controller 21 according to this embodiment. FIG. 17 comprises FIG. 2, as modified by adding a pixel difference calculator 33 for calculating the pixel difference signal 25. The difference calculator 30 outputs the difference signal 32 by the following way stated hereinbefore in reference to FIG. 2. The absolute or squared difference values of luminance intensity of pixels between the input image signal 12 and the motion compensation predictive signal 14 are summated within a block of pixels (8×8=64).

The value of the difference signal 32 is divided in the pixel difference calculator 33 by the number of pixels in a block of pixels (8×8=64) to produce the average value of the difference signal 32 in order to output the pixel difference signal 25. The pixel difference signal 25 is the threshold value of quantization which is output to the encoder 4. The encoder 4 decides the optimal quantization step size for coding the image signal under the condition that qantizatlon error does not exceed the value of the pixel difference signal 25.

Figure 18:
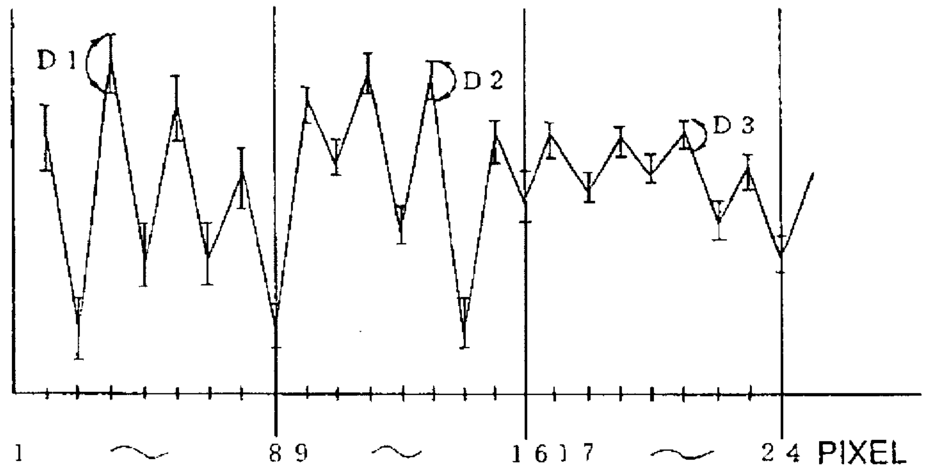
FIGS. 18(*a*), 18(*b*), 18(*c*) and 18(*d*) are explanation diagrams of an operation of an encoder according to the embodiment with reference to FIG. 16.

FIGS. 18(*a*), 18(*b*), 18(*c*) and 18(*d*) show the pixel difference of an image signal illustrating the operation of deciding the quantization step size in the encoder 4 in accordance with this embodiment.

In FIG. 18(*a*), D1 designates the pixel difference of a block containing eight pixels. D2 designates the pixel difference of another block of eight pixels, and D3 designates the pixel difference of another block of eight pixels. Those pixel differences are supposed to be given the following condition in the filter controller 21 as shown in FIG. 18(*b*): D1>D2>D3.

When the pixel difference signal 25 is input into the encoder 4, the encoder 4 selects the optimal quantization step size for an input image signal based upon the pixel difference signal 25, so that the value of quantization error should be less than the value of the pixel difference signal 25. With D1 as the pixel difference signal 25, for instance, the encoder 4 selects a quantization step size SS1 (SS1<D1), with D2 as the signal a step size SS2 (SS2<D2) is selected; and a step size SS3 (SS3<D3) is selected for D3.

Under that condition, the encoder 4 quantizes an input image signal by selecting the optimal quantization step sizes based upon the value on the pixel difference signal 25 in the following relations as shown in FIG. 18(*d*): SS1>SS2>SS3.

Thus, the quantization step size becomes larger when the difference between the input image signal 12 and the motion compensation predictive signal 14 is large. On the other hand, the quantization step size becomes smaller when the difference between the two signals is smaller. Consequently this leads to a highly efficient coding performance minimizing the quantization error to have a high quality decoded image.

The pixel difference signal 25 is not the only signal used to decided the quantization step size in the encoder 4. The quantization step size is also controlled or limited by the size of an output buffer which temporarily stores coded signals to be output from the encoder 4. The size of the buffer can limit the quantity of coding signals. In this case, the quantization step size is limited by the size of the output buffer.

Embodiment 6

Figure 19:
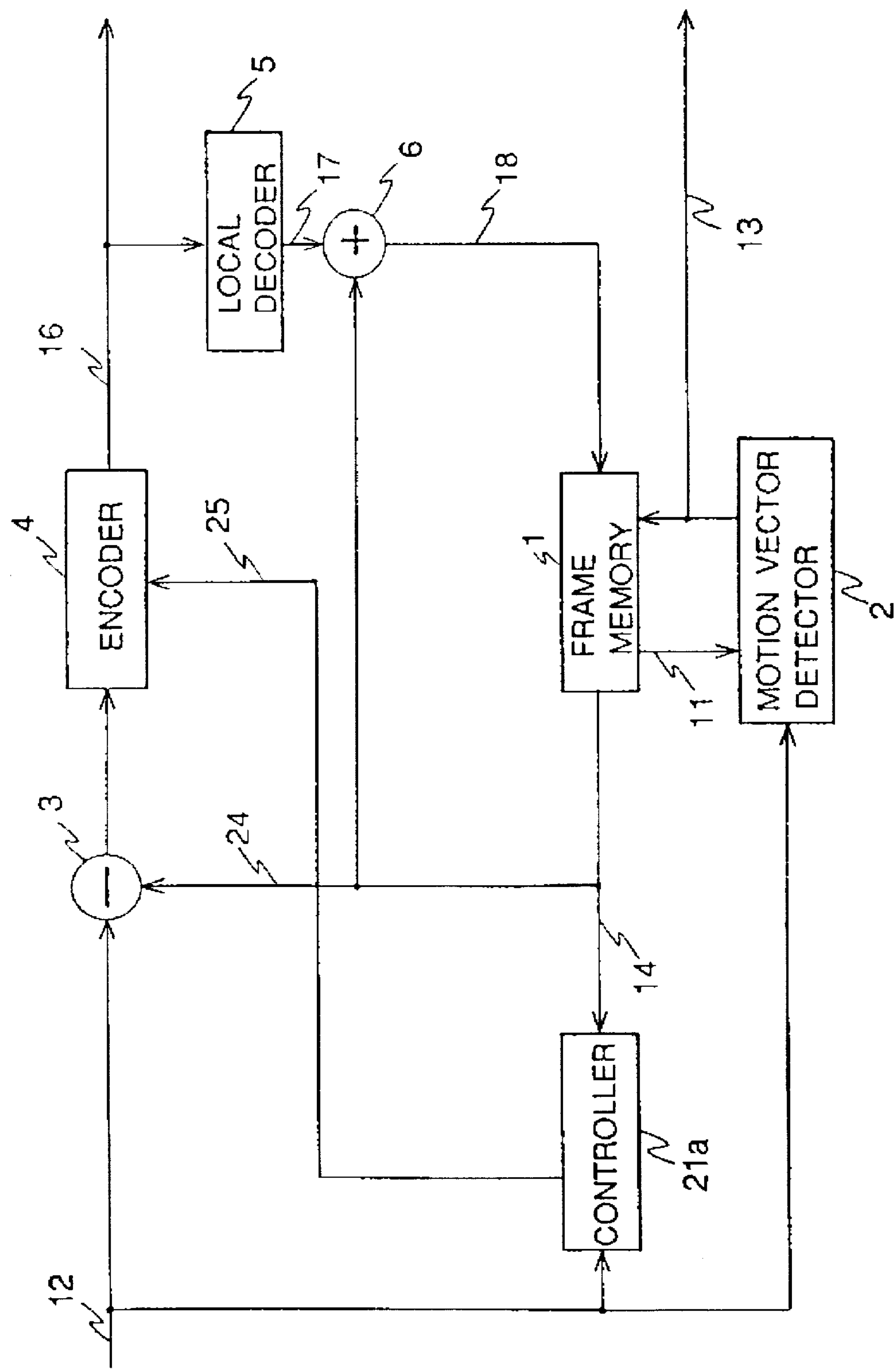
FIG. 19 shows a block diagram of a configuration of an interframe coding system according to another embodiment of the present invention.

With further reference to FIG. 16, the interframe coding system in accordance with the invention can provide a controller 21*a* to output a control signal 25 to the encoder 4 for controlling the quantization step size. In this embodiment the adaptive filter 22 and the filter control signal 23 are not necessarily provided as shown in FIG. 19.

Figure 20:
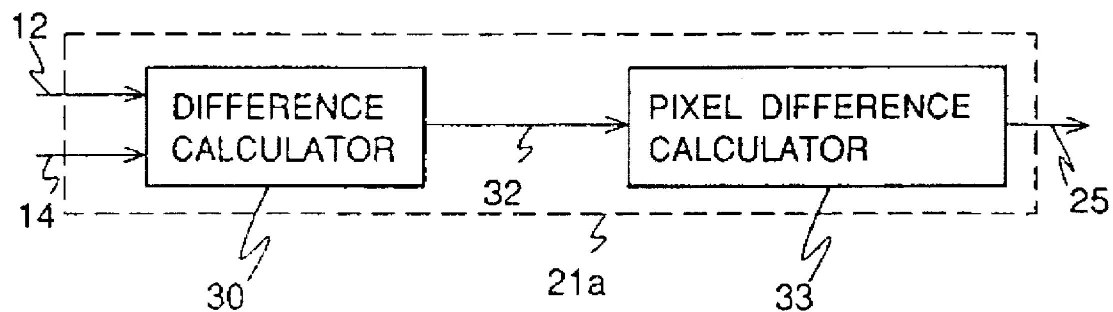
FIGS. 20(*a*), 20(*b*) and 20(*c*) show block diagrams of a configuration of a controller according to the embodiment with reference to FIG. 19.
Figure 20:
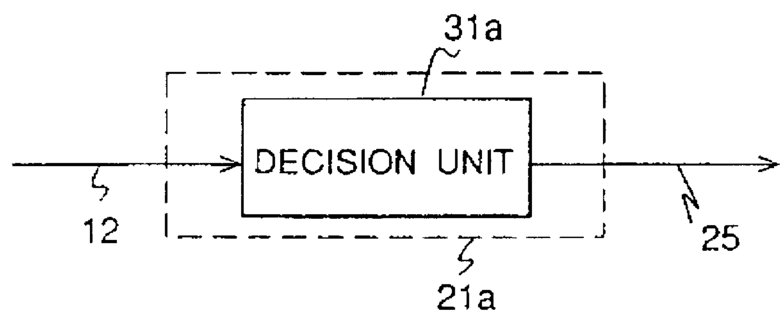
Figure 20:
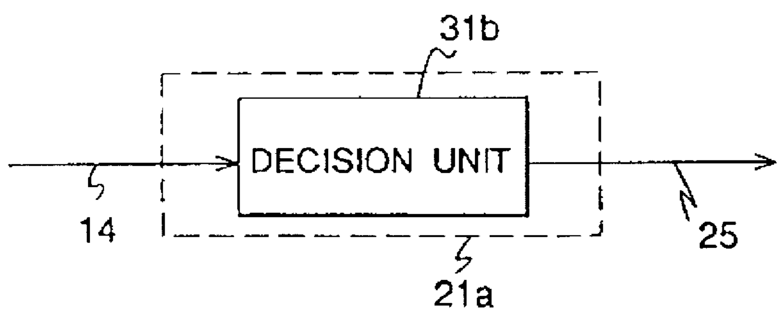

FIG. 20(*a*) shows a configuration of the controller 21*a* according to this embodiment. FIG. 20(*a*) comprises FIG. 17, as modified by removing the decision unit 31. The operation of the difference calculator 30 and the pixel difference calculator 33 corresponds to that described in reference to FIG. 17.

FIG. 20(*b*) shows another configuration of the controller 21*a* according to this embodiment providing a decision unit 31*a* which outputs the control signal 25 of the "Activity" of an image signal. The "Activity" is calculated with the input image signal 12 as shown in FIGS. 4 and 5.

The "Activity" of an image signal has a relative value, and not the absolute value, of luminance intensity of an image signal as stated hereinbefore. In other words, "Activity" X in FIG. 5 becomes smaller with an image signal containing a great amount of lower frequency components, while it becomes larger with an image signal containing a great amount of higher frequency components.

Accordingly, the control signal of the "Activity" enables the encoder 4 to perform the optimal coding by selecting flexibly the optimal quantization step size for an image signal.

With further reference to FIG. 20(*b*), the decision unit 31*b* in accordance with the invention can have the motion compensation prediction signal 14 as input information for calculating its "Activity" as shown in FIG. 20(*c*). The overall operation of the decision unit 31*b* is equivalent with that described in FIG. 20(*b*).

Embodiment 7

Figures 21A, 21B:
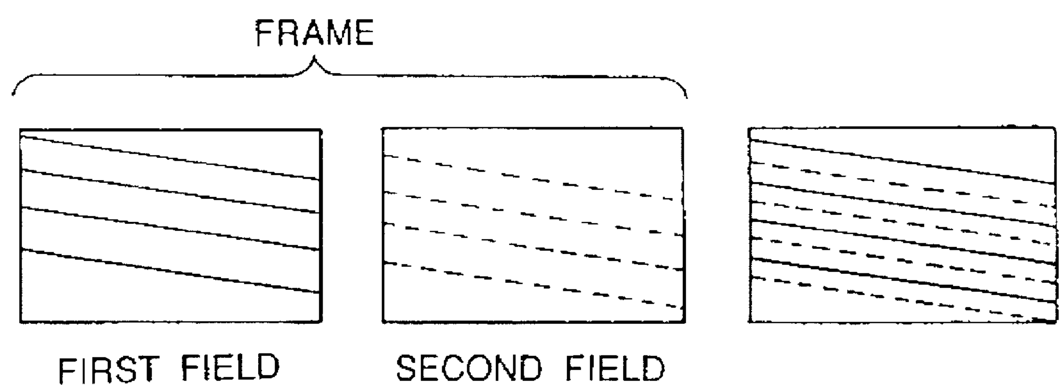
FIGS. 21(*a*) and 21(*b*) are explanation diagrams of frame and field according to another embodiment of the present invention.

With further reference to the embodiments hereinbefore, the frame memory 1 in accordance with the invention can store an image signal not by the frame but by the field as shown in FIG. 21. FIG. 21 shows the relation between the frame and field of an image signal. FIG. 21(*a*) illustrates that the frame of an image signal is consisted of two fields of an image signal, the first and second fields. FIG. 21(*b*) illustrates a frame composed of the first and second fields of an image signal by using an interlace mode.

With further reference to this embodiment, the filtering of an image signal can also be processed by the field.

With further reference to the embodiments hereinbefore, the frame memory 1 in accordance with the invention can store a multiple number of time-varying frames or fields including the past, present, and forthcoming frames or fields.

Embodiment 8

With further reference to the embodiments hereinbefore with FIGS. 2 and 17, the decision unit 31 of the invention can use the motion compensation predictive signal 14, instead of the input image signal 12, to calculate its "Activity" for normalizing the difference signal 32.

Embodiment 9

Figure 22:
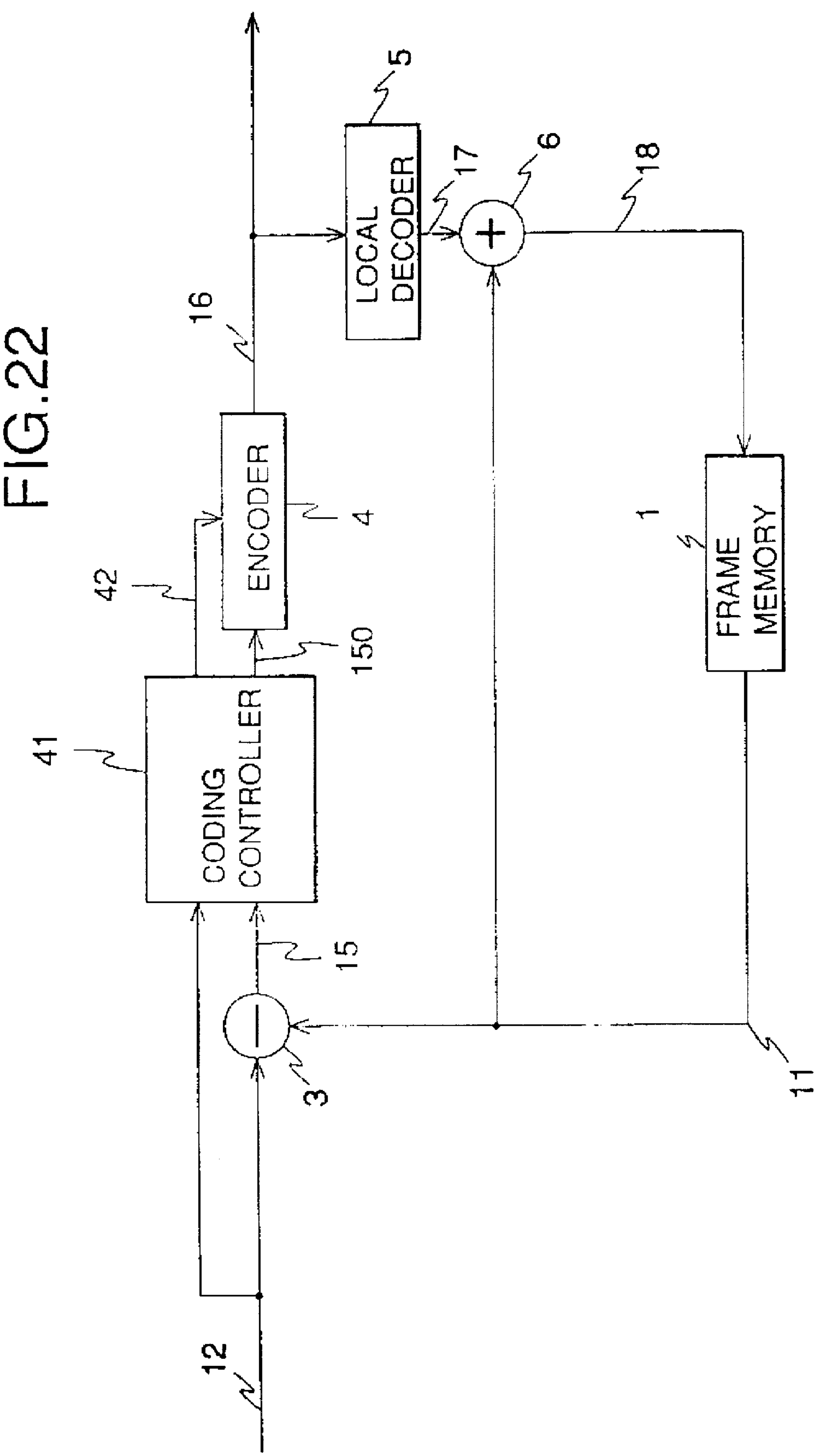
FIG. 22 shows a block diagram of a configuration of an interframe coding system according to another embodiment of the present invention.

FIG. 22 shows a configuration of interframe coding system according to another embodiment of the present invention. FIG. 22 comprises FIG. 1, as modified by adding a coding controller 41, a coding control signal 42 and a select signal 150, and by removing the adaptive filter 22, the filter controller 21 and the motion vector detector 2.

Operation with the local decoding loop of the interframe coding system according to this embodiment is now described with reference to FIG. 22. The image signal 11 of the previous frame stored in the frame memory 1 or the local decoded image signal is used as a predictive image signal. The subtractor 3 subtracts the input image signal 12 from the predictive image signal 11 to output the predictive error signal 15. The coding controller 41 calculates the "Activities" of the input image signal 12 and the predictive error signal 15 to output the coding control signal 42 and the select signal 150, respectively, to the encoder 4.

The encoder quantizes the select signal 150 to output the coded error signal 16. The local decoder 5 decodes the coded error signal 16 to output the local decoded error signal 17. The adder 6 combines the local decoded error signal 17 with the predictive image signal 11 to output the local decoded signal 18. The local decoded signal 18 is stored in the frame memory 1. The coded error signal 16 is, on the other hand, also transmitted through a transmission line.

Figure 23:
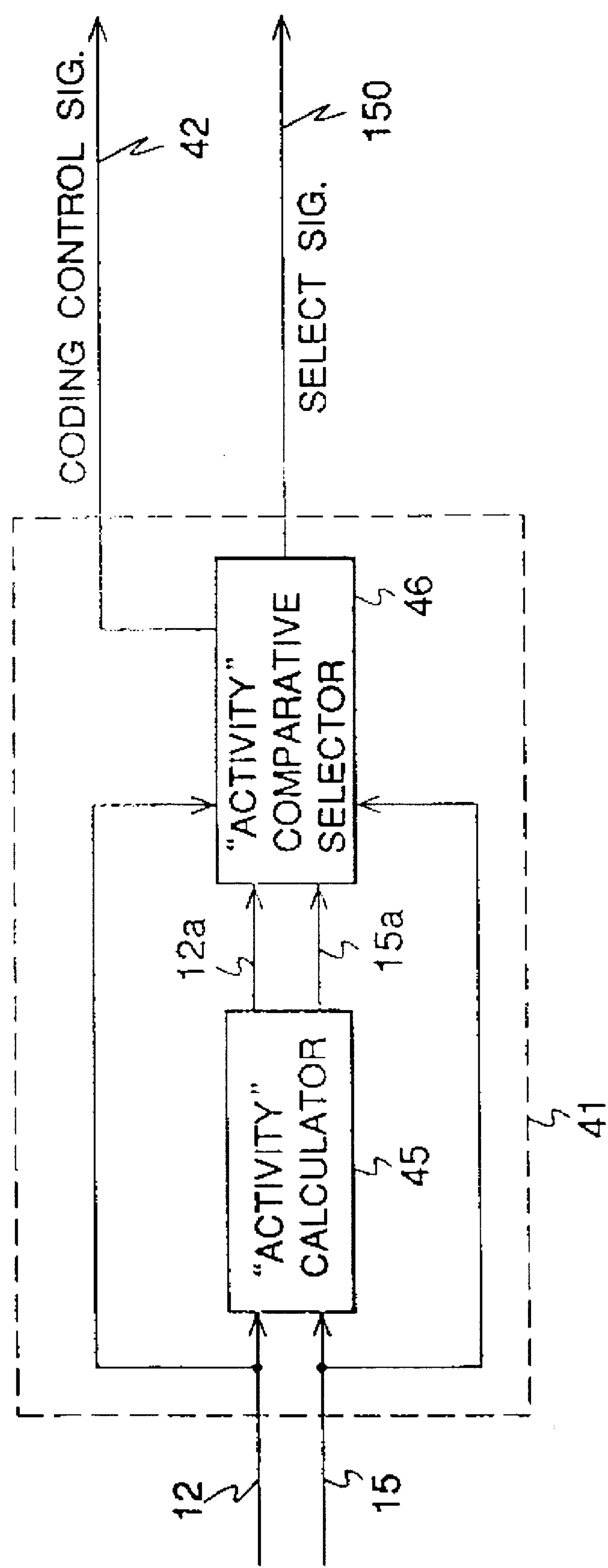
FIG. 23 shows a block diagram of a configuration of a coding controller according to the embodiment with reference to FIG. 22.

Operation of the coding controller 41 in accordance with this embodiment is now described with reference to FIG. 23. The coding controller 41 has an "Activity" calculator 45, an "Activity" comparative selector 46, an "Activity" signal 12*a* based upon the input image signal 12, an "Activity" signal 15*a* based upon the predictive error signal 15, the coding control signal 42 and the select signal 150.

In the coding controller 41, the "Activity" calculator 45 calculates each "Activity" of the input image signal 12 and the predictive error signal 15 to output their "Activities" to the "Activity" comparative selector 46.

The "Activity" of an image signal can be the difference between the maximum and minimum values of luminance intensity of pixels of a signal or the sum of the absolute or squared values of the difference between the mean value and the values of luminance intensity of a block of pixels in an image signal as stated hereinbefore with reference to FIGS. 4 and 5. The "Activity" does not refer to the absolute luminance intensity of each pixel in an image signal. It involves a block of pixels of an image signal. When a block of pixels of an image signal contain a great amount of lower frequency components its "Activity" becomes smaller, while when they contain a great amount of higher frequency components its "Activity" becomes larger.

In the "Activity" comparative selector 46, the "Activities" 12*a* and 15*a* are compared to select an optimal mode signal under a given priority based upon the user's or system's needs. The priority could be:

(1) to prioritize coding efficiency;

(2) to prioritize picture quality; or, (3) to put significance both on the coding efficiency and the picture quality and prioritize either of them if one has more significance depending on a given situation.

There are more possible significant items can be added to the list of condition stated above, apart from coding efficiency and picture quality. Condition can be limited depending on the purpose or capacity of the system or the user's needs. When coding efficiency is prioritized, for instance, a mode signal of the image signal with smaller "Activity" by the comparison is output by the "Activity" comparison selector 46 as stated hereinbefore. On the other hand, when picture quality is prioritized, the mode signal of the input image signal 12 is output by the "Activity" comparison selector 46. When both of coding efficiency and picture quality are prioritized, the "Activity" comparative selector 46 outputs the mode signal of either the input image signal 12 or the predictive error signal 15 based upon the comparison result of their "Activities" under a certain consideration.

The "Activity" comparative selector 46 outputs the coding control signal 42 providing coding parameters. The coding parameters include the quantization step size based upon the condition and the "Activities" of the image signals. The "Activity" comparison selector 46 also outputs the image signal selected by the mode signal as the select signal 150.

Operation of the "Activity" comparative selector 46 according to this embodiment is now described with reference to FIG. 24. The "Activity" comparative selector 46 has a weighting circuit **46*a*, a comparator 46*b* and a control signal generator 46*c*. The weighting circuit 46*a* weights the "Activity" of the input signal 12*a* and/or the "Activity" of the predictive error signal 15*a*. The comparator 46*b* compares the "Activity" of the input image signal 12*a* with the "Activity" of the predictive error signal 15*a* output from the weighting circuit 46*a*. The control signal generator 46*c* selects either the input image signal 12 or the predictive error signal 15 as the select signal 150 and also outputs the coding control signal 42 by multiplexing the quantization step size, coding coefficients. etc. The weighting circuit 46*a* will be left to the later discussion for a brief description of the "Activity" comparative selector 46 in this embodiment. Accordingly, the comparator 46*b* inputs the "Activity" of the input image signal 12*a* and the "Activity" of the predictive error signal 15*a*. The comparator 46*b* compares those "Activities" and outputs a mode signal 46*m* based upon the comparison result to the control signal generator 46*c*. The mode signal 46*m* actuates a switch to input either the input image signal 12 or the predictive error signal 15 in the control signal generator 46*c*. The mode signal 46*m* is output as a part of the coding control signal 42 as one of the coding parameters included in the multiplexed signal together with the quantization step size, discrete cosine transform (DCT) coefficients, etc. to the encoder 4. The encoder 4 demultiplexes and checks the multiplexed coding control signal 42, whereby the encoder 4 is informed, for instance with the mode signal, which signal is selected as the select signal 150 of the input image signal 12 and the predictive error signal 15. When the input image signal 12 is selected as the select signal 150, the encoder 4 performs "intraframe" coding, while the predictive error signal 15 is selected, the encoder 4** performs "interframe" coding. Interframe and intraframe codings are controlled by quantization step sizes and the DCT coefficients.

Embodiment 10

Figure 25:
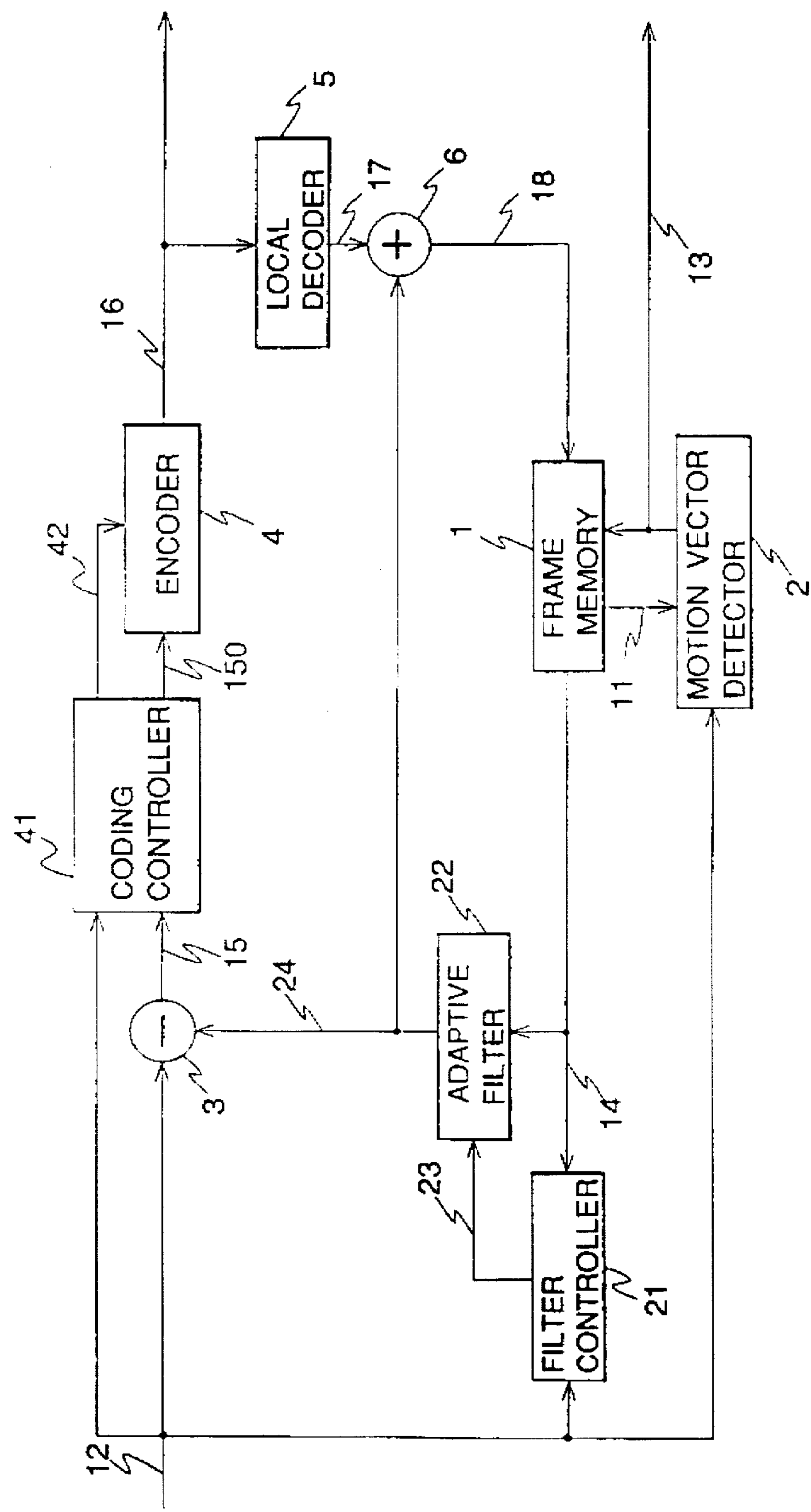
FIG. 25 shows a block diagram of a configuration of an interframe coding system according to another embodiment of the present invention.

With further reference to the previous embodiment referring to FIG. 22, the interframe coding system in accordance with the invention can have a filter controller, an adaptive filter and a motion vector detector as shown in FIG. 25. Accordingly, FIG. 25 comprises FIG. 22, as modified by adding the motion vector detector 2, the motion vector signal 13, the motion compensation predictive signal 14, the filter controller 21, the adaptive filter 22, the filter control signal 23 and the predictive signal 24.

Operations of the motion vector detector 2, the filter controller 21 and the adaptive filter 22 correspond to those described in the first embodiment referring to FIG. 1.

With further reference to FIG. 22, the predictive error signal 15 in accordance with the invention can be based partly upon the filtered predictive signal 24 through the filter controller 21 and the adaptive filter 22 as shown in FIG. 25 instead of the predictive signal 11 unfiltered in FIG. 22. In other words, the predictive error signal 15 is the subtracted result of the input image signal 12 by the filtered predictive signal 24 in the subtractor 3. Consequently, the coding controller 41 according to this embodiment compares the "Activity" of the input image signal 12 and the "Activity" of the filtered predictive error signal 15 to output the coding control signal 42.

The filter controller 21 according to this embodiment calculates the difference between the input image signal 12 and the image signal from the frame memory 1 or the motion compensation predictive signal 14. The filter controller 21 normalizes the difference by the "Activity" of either the input image signal 12 or the motion compensation predictive signal 14. Accordingly, the optimal filtering intensity for the motion compensation predictive signal 14 is decided based upon the normalized result. This can contribute to a desirable elimination of higher frequency components in the image signal leaving no higher frequency components in the prediction error signal, which leads to a high coding efficiency. The coding control signal 42 according to this embodiment can be output by the coding controller 41 based upon the mode signal. The mode signal is to select the image signal having smaller "Activity" of the two: the "Activities" of the input image signal **12*a* and the "Activity" of the optimally filtered prediction error signal 15*a***. This also contributes to a high coding efficiency.

Embodiment 11

With further reference to the previous two embodiments, the "Activity" comparative selector 46 in the coding controller 41 in accordance with the invention can select the mode signal **46*m* based only upon the input signal resulted in the smallest "Activity" in the "Activity" comparison. Accordingly, the "Activity" comparative selector 46 outputs the mode signal based upon the smallest "Activity" in the comparator and outputs the coding control signal 42** of coding parameter, including the quantization step size, etc. based upon the mode signal and the "Activity".

An image signal with smaller "Activity" indicates that the image signal can be coded with higher coding efficiency in the encoder.

Embodiment 12

With further reference to the previous two embodiments or FIGS. 22 and 25, the "Activity" comparative selector 46 in accordance with the invention can weight "Activities" of the input signals, at least one of them, for comparison.

Figure 24:
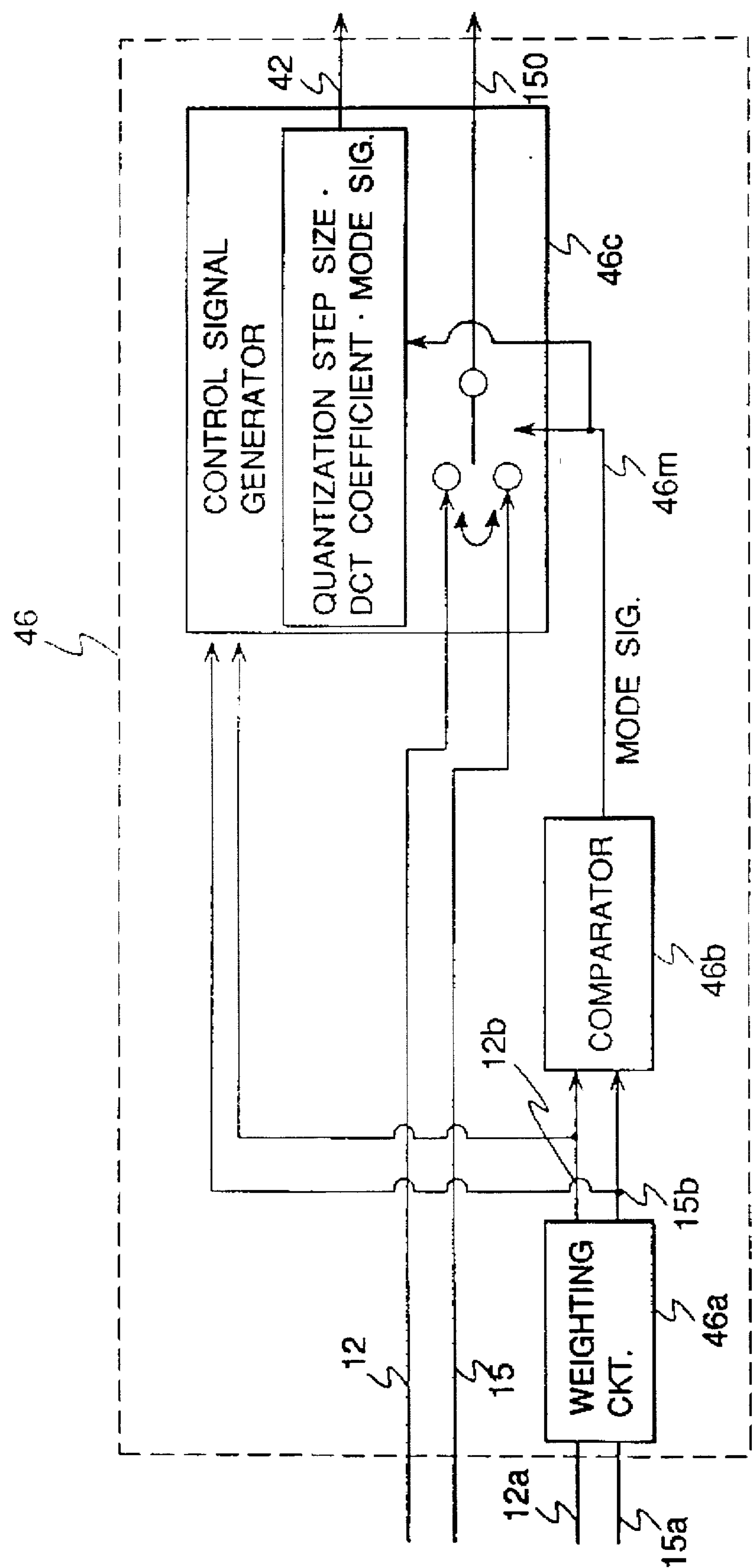
FIG. 24 shows a block diagram of a configuration of a "Activity" comparative selector according to the embodiment with reference to FIG. 22.
Figure 26:
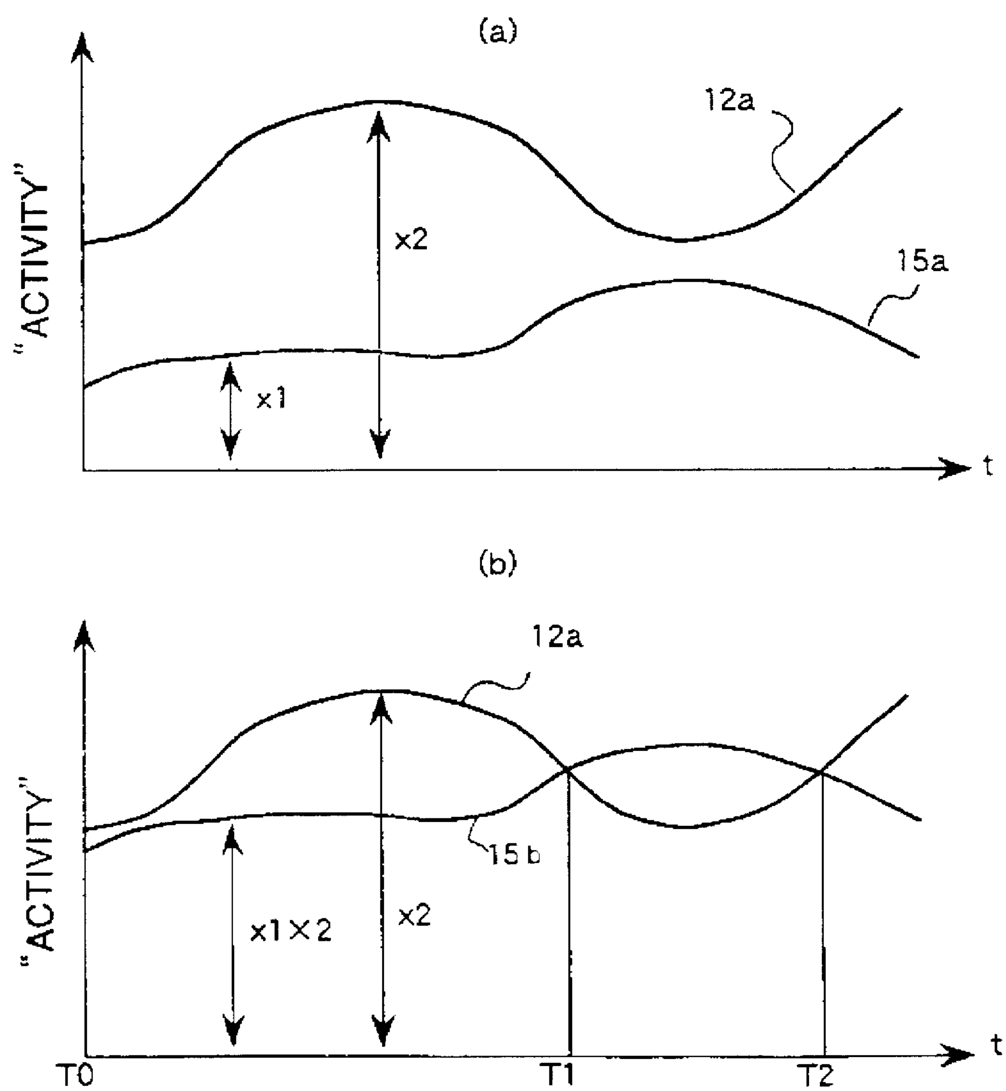
FIG. 26 is an explanation diagram of weighting operated in a weighting circuit according to the embodiment with reference to FIG. 25.

The significance and operation of weighting "Activity" operated in the weighting circuit **46*a* in the "Activity" comparative selector 46 in FIG. 24 is now described with reference to FIGS. 24 and 26. FIG. 26 shows the relation between the "Activities" of input signals and weighting. FIG. 26**(*a*) shows the original "Activity" of the input image signal 12a and the original "Activity" of the predictive error signal with no weight added in the weighting circuit 46a. FIG. 26(b) shows the original "Activity" of the input image signal 12a with no weight added and the "Activity" of the predictive error signal with twice as much weight added as the original "Activity".

Under the condition that the "Activity" comparative selector 46 is to select the mode of an input signal with the smallest "Activity", the "Activity" comparative selector 46 selects the predictive error signal 15 as the select signal 150 according to FIG. 26(a). The figure shows that the "Activity" of the predictive error signal 15a is constantly smaller than the "Activity" of the input image signal 12a.

Under that condition, the "Activity" comparative selector 46, on the other hand, selects either of the signals alternatively of the input image signal 12 or the predictive error signal 15 added a twofold weight on its "Activity" 15b when it has smaller "Activity" than the other as the select signal 150 according to FIG. 26(b). The figure shows that the predictive error signal 15 is selected during the time period T0 through T1 as the select signal 150. The input image signal 12 is selected during the time period T1 through T2 as the select signal 150 due to the weighting on the predictive error signal.

Figure 27:
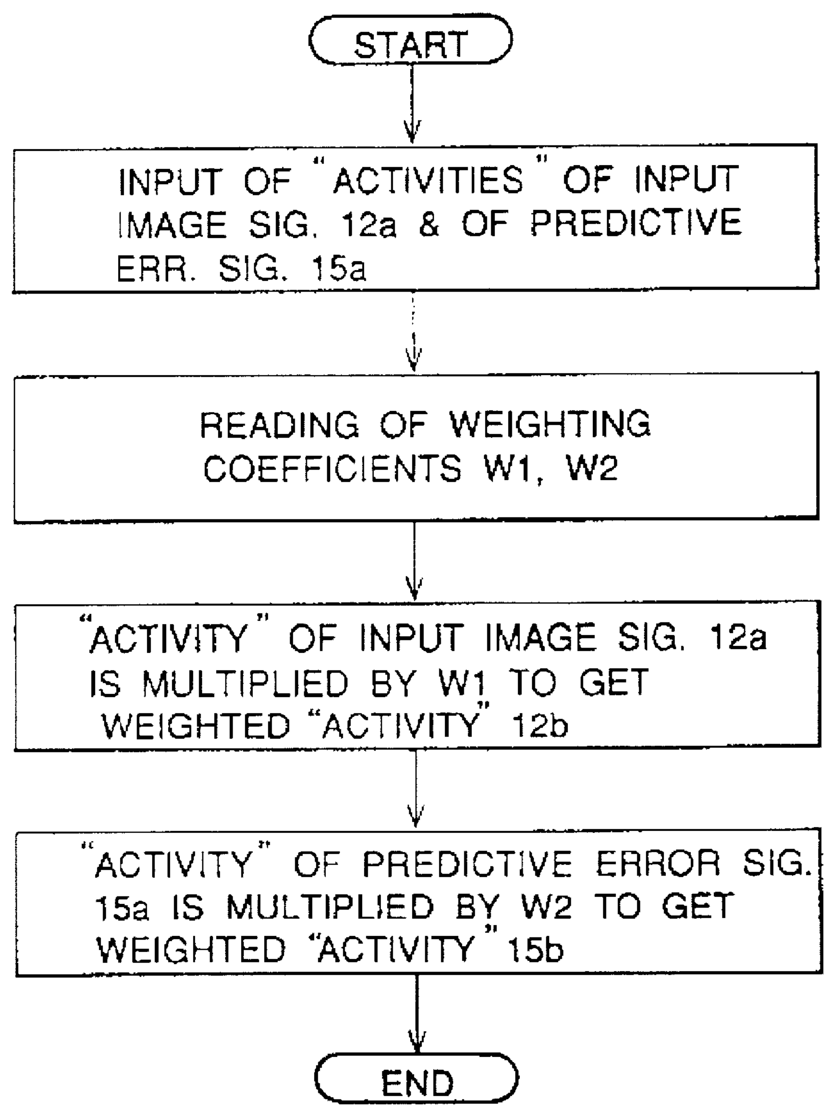
FIG. 27 shows a flowchart of the basic operation in the weighting circuit according to the embodiment.

FIG. 27 shows a flowchart of the basic operation in the weighting circuit 46a according to the embodiment in reference to FIG. 24. When the weighting circuit 46a inputs the "Activity" of the input image signal 12a and the "Activity" of the predictive error signal (difference signal between the input image signal 12 and the predictive signal from the frame memory) 15a, the circuit reads out the previously assigned weighting coefficients W1 and W2, respectively, for the signals. The input "Activities" of the signals 12a and 15a are multiplied by the weighting coefficients W1 and W2, respectively, and a weighted "Activity" of the input image signal 12b and a weighted "Activity" of the predictive error signal 15b is output.

With further reference to this embodiment, the weighting circuit 46a in accordance with the invention can weight only one of the "Activities" of the input signals instead of both of them.

With further reference to the embodiment, the weighting circuit 46a in accordance with the invention can process three or more input signals, instead of two as described in this embodiment. An example of using three input signals in that condition will be described later in reference to FIG. 33.

Figure 28:
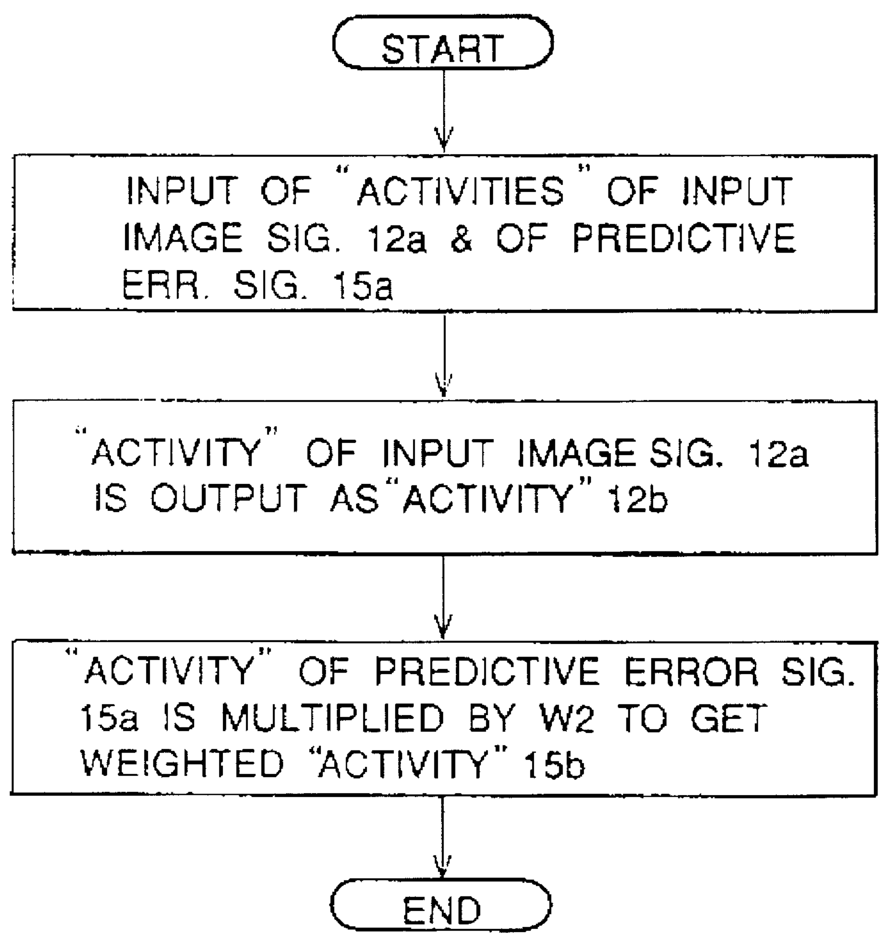
FIG. 28 shows a flowchart of an example of weighting operation in the weighting circuit according to the embodiment.

FIG. 28 shows a flowchart of an example of weighting operation in the weighting circuit 46a according to the embodiment in reference to FIG. 26. In this example, the "Activity" of the input image signal 12a is not weighted and output as "Activity" 12b after the weighting circuit. The "Activity" of the predictive error signal 15a is doubled by the weight and output as its weighted "Activity" 15b.

Figure 29:
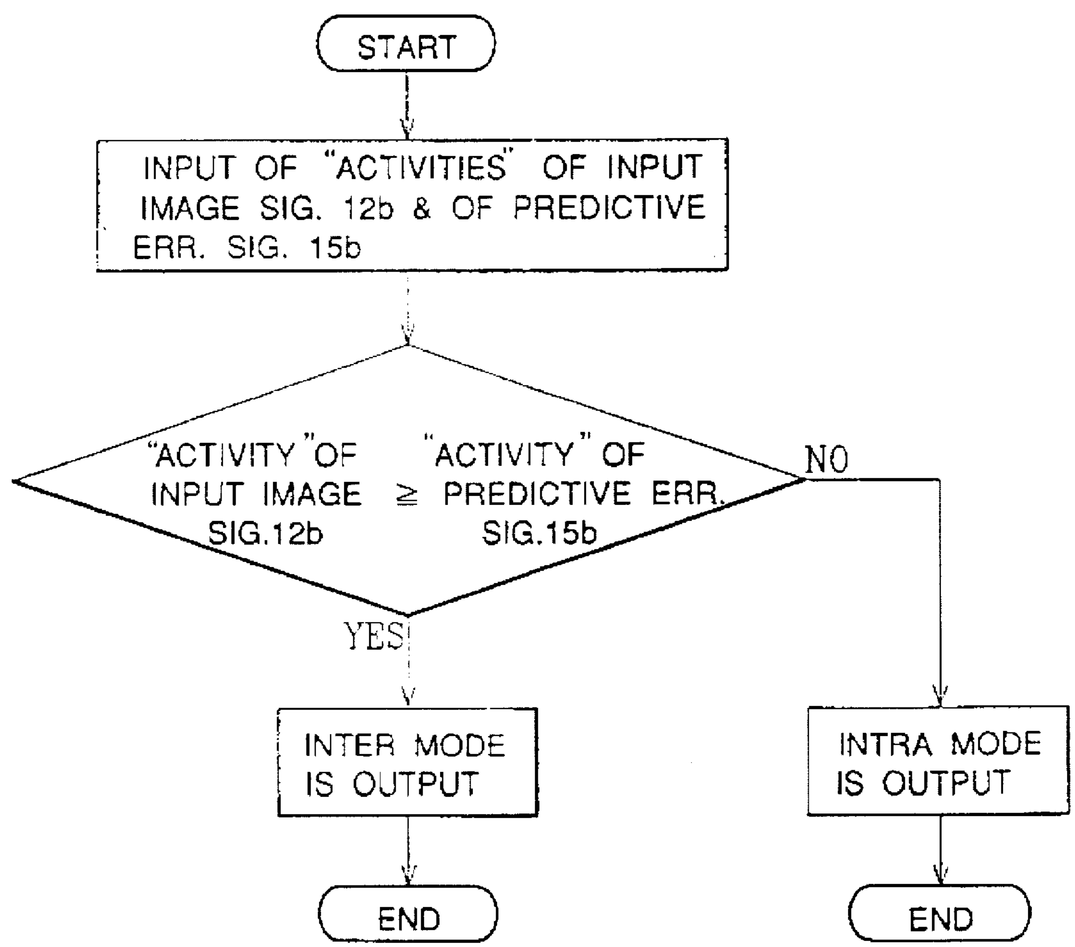
FIG. 29 shows a flowchart of the basic operation in the comparator according to the embodiment.

FIG. 29 shows a flowchart of the basic operation in the comparator 46b according to the embodiment in reference to FIG. 24.

The comparator 46b compares the input "Activities" of the input image signal 12b and of the predictive error signal 15b from the weighting circuit 46a to decide a coding mode. When "Activity" 12b is smaller than "Activity" 15b, the comparator 46b selects INTRA mode (for an intraframe coding) while the comparator selects INTER mode (for an interframe coding) when "Activity" 12b is larger than "Activity" 15b. When the comparator selects the mode, it outputs mode signal 46m to the control signal generator 46c.

With further reference to the embodiment, the weighting circuit 46a in accordance with the invention can process three or more input signals, instead of two as described in this embodiment. An example of using three input signals in that situation will be described later in reference to FIG. 33.

Figure 30:
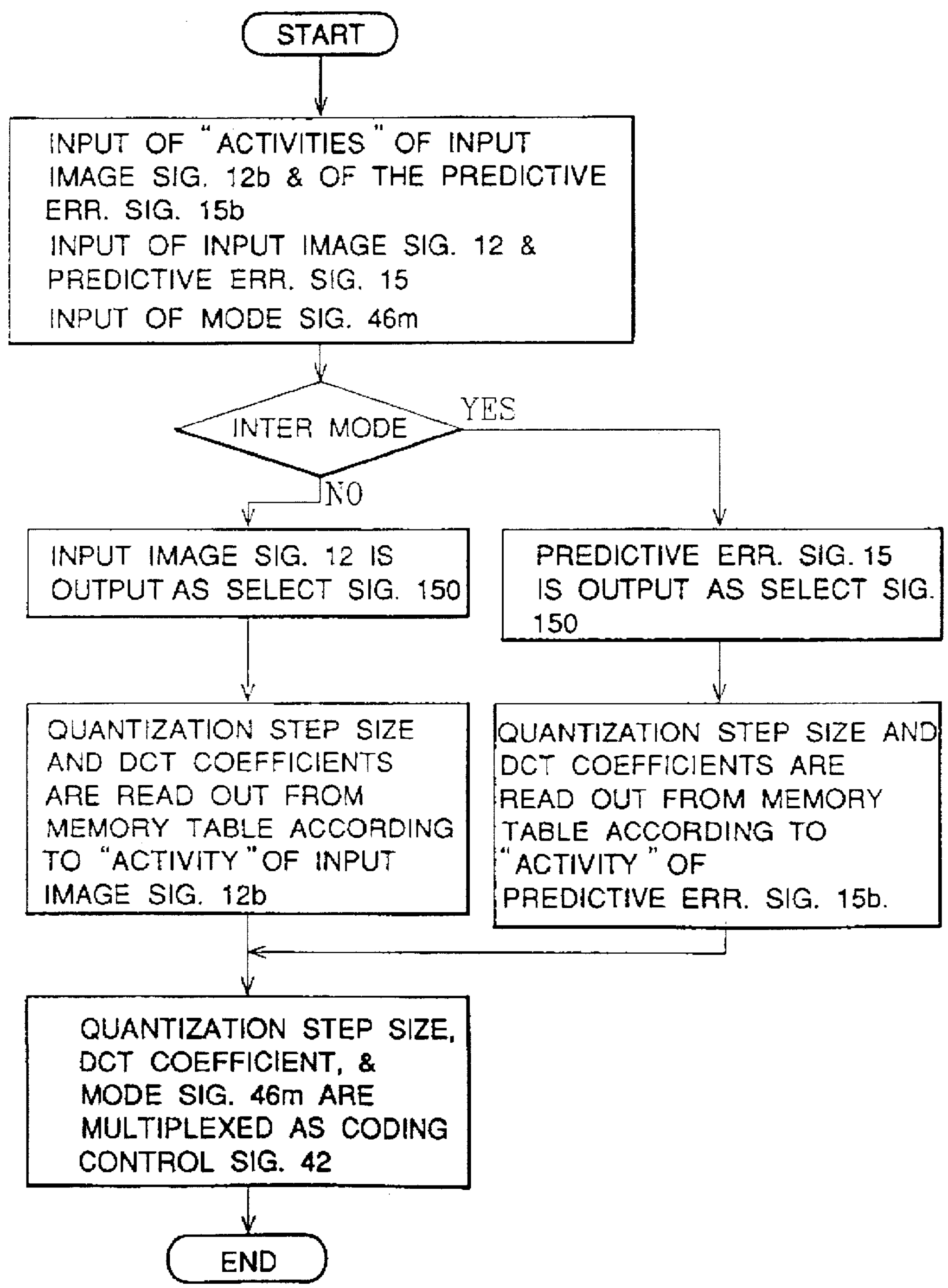
FIG. 30 shows a flowchart of the basic operation in the control signal generator according to the embodiment.

FIG. 30 shows a flowchart of the basic operation in the control signal generator 46c according to the embodiment in reference to FIG. 24.

The control signal generator 46c inputs the input image signal 12, the predictive error signal 15, the weighted "Activity" of the input image signal 12b, the weighted "Activity" of the predictive error signal 15b and the mode signal 46m. The control signal generator 46c outputs the control signal 42 and one of the input signals as the select signal 150 based upon the mode signal 46m. The control signal generator 46c is informed of the selection of either the INTER or INTRA mode with the mode signal 46m. When the INTER mode is selected, the control signal generator outputs the predictive error signal 15 as the select signal 150. When the INTRA mode is selected, the control signal generator outputs the input image signal 12 as the select signal 150. The control signal generator 46c reads out the optimal quantization step size (QUANT) and the number of the DCT coefficients in the memory table in FIG. 31 according to the weighted "Activity" of the selected signal 12b or 15b. The readout quantization step size (QUANT) and DCT coefficients as well as the mode signal 46m are multiplexed to be output as the control signal 42.

With further reference to the embodiment, the control signal generator 46c in accordance with the invention can input the "Activity" of the input image signal 12a and the "Activity" of the predictive error signal 15a, instead of the weighted "Activities" of those signals 12b and 15b. In this case, the threshold values or the contents of the memory table in FIG. 31 have to be altered.

With further reference to the embodiment, the number of threshold value in FIG. 31 in accordance with the invention can be varied according to the assigned QUANT and DCT coefficients. The values of the QUANT and DCT coefficients can be also assigned based upon a given condition or priority, such as the picture quality or coding efficiency.

Thus, selective, intentional control of an output signal, or the select signal 150 can be realized by the weighting technique. In other words, weighting can control the selection probability of input image signals in the "Activity" comparative selector 46. The select signal 150 can be controlled by weighting technique which is provided with previously set weighting coefficients in the weighting circuit according to the user's or system's needs, or according to the picture quality desired.

Embodiment 13

With further reference to FIG. 25, the coding controller 41 in accordance with the invention can compare the "Activity" of the filtered predictive error signal with the "Activity" of the unfiltered predictive error signal to output the coding control signal 24 based upon the compared result, specifically, the signal with smaller "Activity".

Figure 32:
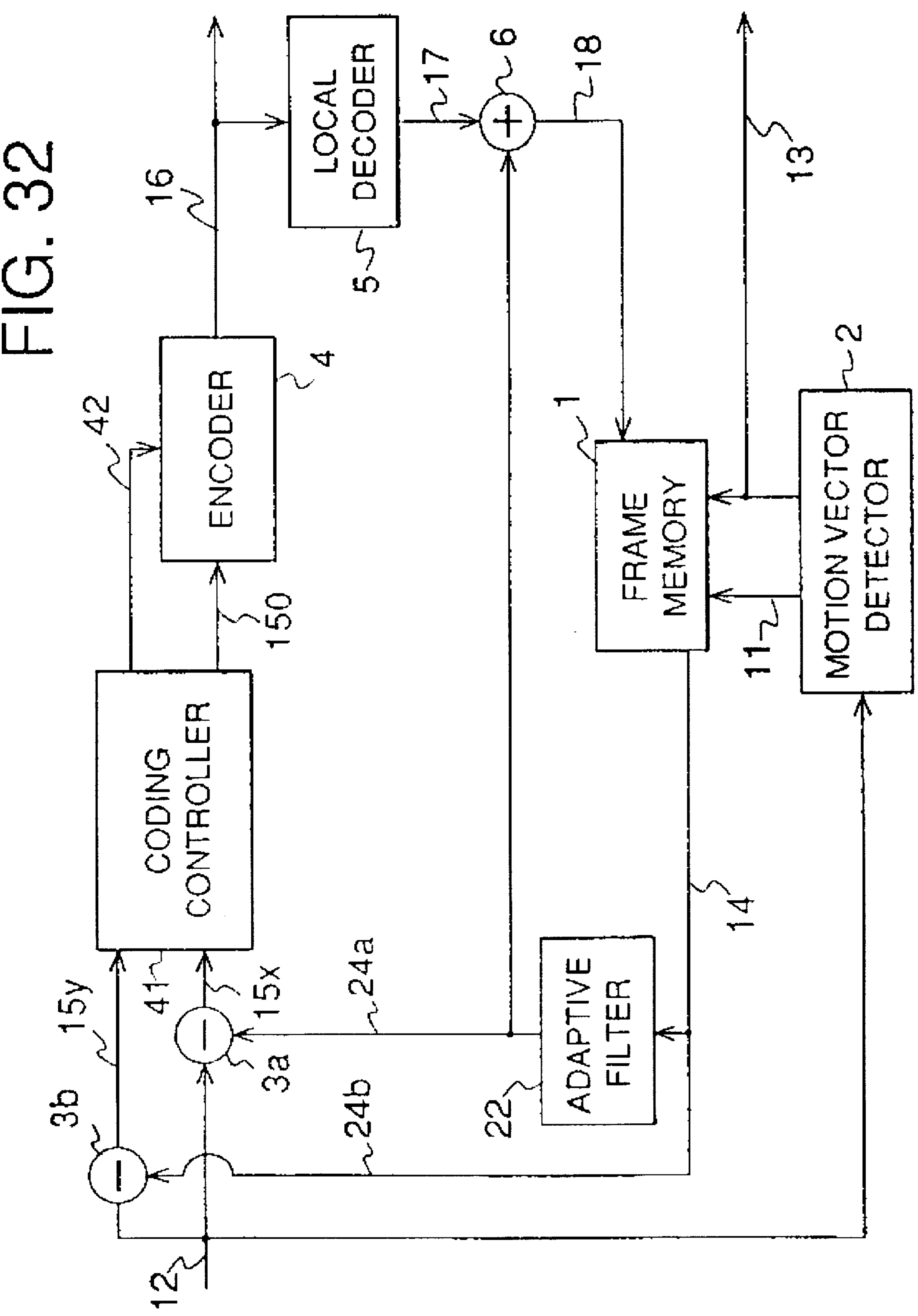
FIG. 32 shows a block diagram of a configuration of an interframe coding system according to another embodiment of the present invention.

FIG. 32 shows a configuration of interframe coding system according to this embodiment providing a predictive signal 24a filtered in the adaptive filter 22 and a predictive signal 24b unfiltered or the motion compensation predictive signal 14. Those predictive error signals 24a and 24b are subtracted, respectively, from the input image signal 12 in the subtractors 3a and 3b. The differences resulted from the subtraction are output as the predictive error signals respectively. The predictive error signals are compared in the coding controller 41 to output the coding control signal 42 in the same manner described hereinbefore.

Embodiment 14

With further reference to FIG. 32 or the previous embodiment, the coding controller 41 in accordance with the invention can add weight on either or both of the "Activities" of the predictive signals, filtered in the adaptive filter 22 or/and unfiltered, for comparison to output the coding control signal 42.

Embodiment 15

With further reference to FIG. 32, the coding control signal 42 in accordance with the invention can be based upon the compared result among the "Activities" of three signals, the filtered predictive error signal and the unfiltered predictive error signal, and the input image signal 12, specifically selecting the mode of the signal with the smallest "Activity".

Figure 33:
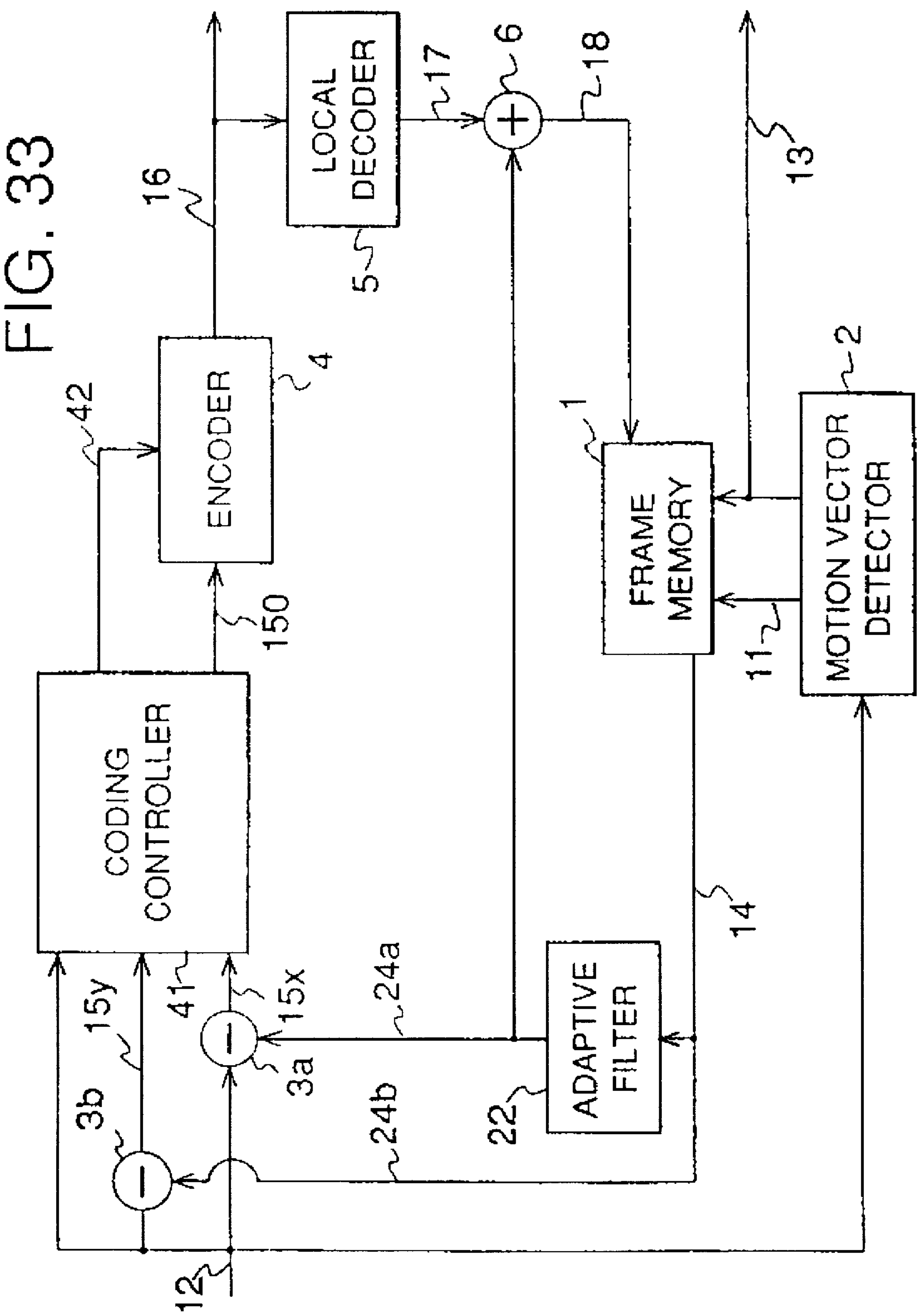
FIG. 33 shows a block diagram of a configuration of an interframe coding system according to another embodiment of the present invention.

FIG. 33 shows a configuration of interframe coding system according to this embodiment. FIG. 33 comprises FIG. 32, as modified by adding the input image signal 12 input in the coding controller 41. The coding controller 41 uses three input signals of the input image signal 12, the filtered predictive error signal 15*x* and the unfiltered predictive error signal 15*y* for the "Activity" comparison to output the coding control signal 42 by selecting the mode of the signal with the smallest "Activity".

Figure 34:
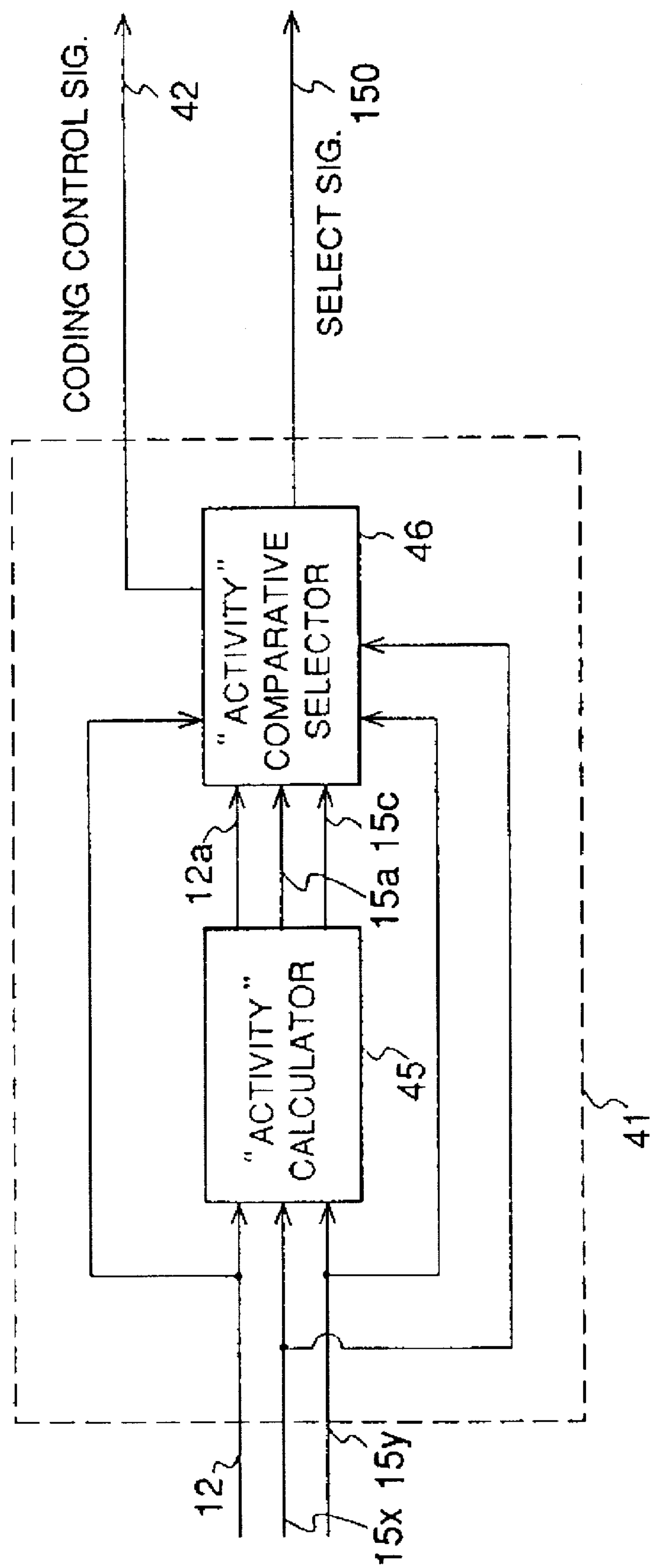
FIG. 34 shows a block diagram of a configuration of a coding controller according to the embodiment.
Figure 35:
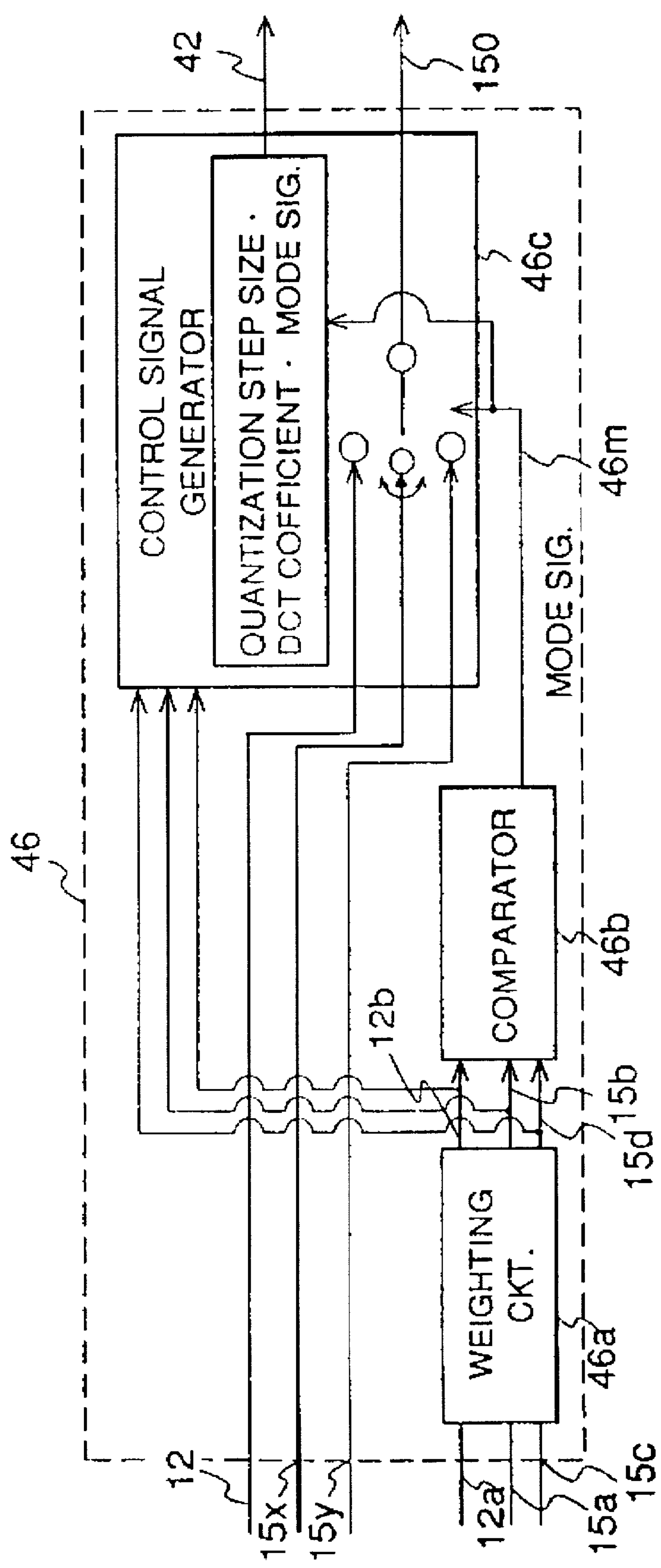
FIG. 35 shows a block diagram of a configuration of an "Activity" comparative selector according to the embodiment.

FIG. 34 shows a block diagram of a configuration of the coding controller 41 according to the embodiment. FIG. 34 comprises FIG. 23, as modified by adding a filtered predictive error signal 15*x* and an unfiltered predictive error signal 15*y*, instead of the predictive error signal 15 and also adding an "Activity" of the filtered predictive error signal 15*a* and an "Activity" of the unfiltered predictive error signal 15*c*. Therefore the coding controller 41 according to this embodiment inputs three signals, instead of two as described hereinbefore. The "Activity" calculator 45 calculates the "Activities" of the three signals and outputs the calculated result to the "Activity" comparative selector 46. FIG. 35 shows a block diagram of a configuration of the "Activity" comparative selector 46 according to the embodiment. FIG. 35 comprises FIG. 24, as modified by adding the filtered predictive error signal 15*x*, the unfiltered predictive error signal 15*y*, the "Activity" of the predictive error signal 15*c*, and a weighted "Activity" of the predictive error signal 15*d*. The three input "Activities" of the signals in the "Activity" comparative selector 46 are added weight in the weighting circuit 46*a*. Weighting coefficients W1, W2, and W3 1s assigned in the weighting circuit in advance. The weighting circuit adds weight by multiplying the "Activity" of input image signal 12*a* by a weighting coefficient W1 to output a weighted "Activity" of the input image signal 12*b* to the comparator 46*b*. In the same manner, the "Activity" 15*a* is multiplied by W2 to have a weighted "Activity" 15*b* and the "Activity" 15*c* is multiplied by W3 to have a weighted "Activity" 15*d*. The comparator 46*b* compares the three weighted "Activities" to generate a mode signal 46*m* based upon the comparison result. The control signal generator 46*c* selects one of the three signals as the output select signal 150, of the input image signal 12, the filtered predictive error signal 15*x*, and the unfiltered predictive error signal 15*y* based upon the mode signal 46*m*. When the input image signal 12 is selected for the select signal 150, the control signal generator 46*c* reads out a quantization step size and a DCT coefficient previously stored in the memory table according to the value of the weighted "Activity" of the input image signal 12*b*. When the filtered predictive error signal 15*x* is selected for the select signal 150, the control signal generator 46*c* reads out a quantization step size and a DCT coefficient in that manner as described hereinbefore based upon the value of the weighted "Activity" of the filtered predictive error signal 15*b*. When the unfiltered predictive error signal 15*y* is selected for the select signal 150, the control signal generator 46*c* reads out a quantization step size and a DCT coefficient in that manner as described hereinbefore based upon the value of the weighted "Activity" of the unfiltered predictive error signal 15*d*. The readout quantization step size and DCT coefficient as well as the mode signal 46*m* are multiplexed to be output as the control signal 42.

Embodiment 16

With further reference to FIG. 33 or the previous embodiment, the coding controller 41 in accordance with the invention can add weight on at least one of the "Activities" of the three signals, the filtered predictive signal 15*a*, the unfiltered predictive error signal 15, and the input image signal 12 for the "Activity" comparison to output the coding control signal 42 based upon the signal with the smallest "Activity".

Embodiment 17

With further reference to the previous embodiment, the coding control signal 42 in accordance with the invention can be output based upon a mode signal derived from an image signal with smaller "Activity" compared between those of the filtered predictive error signal 15*a* and the input image signal 12*a*.

Embodiment 18

With further reference to the previous embodiment, the coding controller 41 in accordance with the invention can add weight on either or both of the "Activities" of the filtered predictive error signal through the processing units or/and the input image signal 12 for comparison to output the coding control signal 42.

Figure 36:
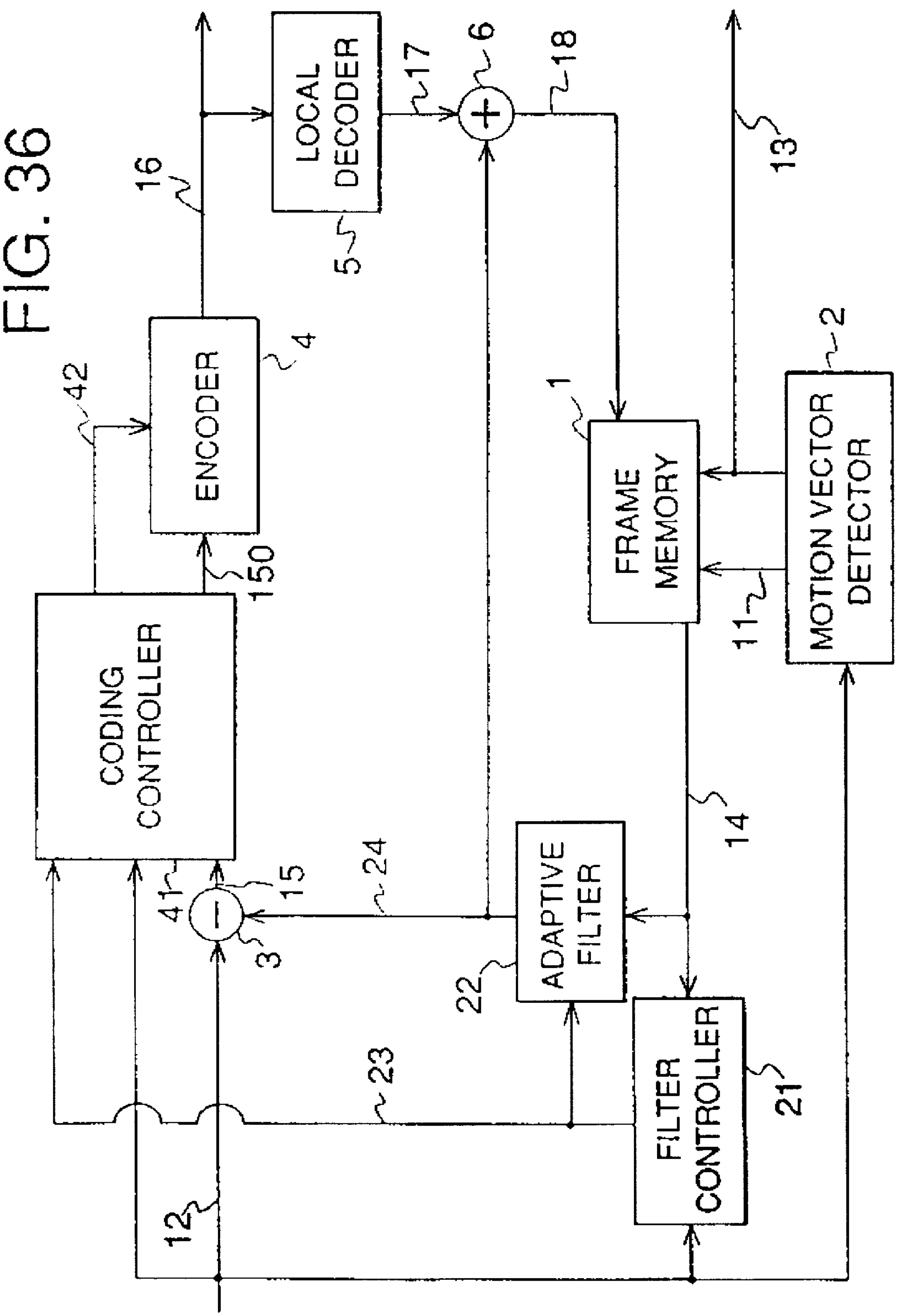
FIG. 36 shows a block diagram of a configuration of an interframe coding system according to another embodiment of the present invention.

FIG. 36 shows a configuration of interframe coding system according to this embodiment. FIG. 36 comprises FIG. 25, as modified by adding another input of the filter control signal 23 from the filter controller 21 into the coding controller 41. The filter control signal 23 is for a weighting control. The filter control signal informs the coding controller 41 of the condition of the predictive error signal 15 whether it is filtered or not in the adaptive filter 22. The control signal 23 is analyzed in the weighting circuit 46 in the coding controller 41 to inform whether the adaptive filter 22 is ON or OFF. When the weighting circuit 46 knows that the predictive error signal 15 is based upon the predictive signal 24 filtered in the adaptive filter 22, for example, it adds weight on the predictive error signal 15. When the weighting circuit 46 knows that the predictive error signal 15 is based upon the predictive error signal 24 unfiltered in the adaptive filter 22, on the other hand, it does not add weight on the predictive error signal. Dynamic weighting control can be realized with a variety of modes or values in the filter control signal 23 providing more than two modes of ON and OFF.

Embodiment 19

With further reference to FIG. 25, the filter control signal 23 in accordance with the invention can be output the filter control signal 23 based just upon the difference between the input image signal 12 and the image signal from the frame memory 1 without normalizing the difference in the filter controller 21.

Embodiment 20

With further reference to FIG. 25, the filter control signal 23 in accordance with the invention can be output based upon information related to the difference between the input image signal 12 and the image signal from the frame memory 1.

Embodiment 21

With further reference to FIG. 25, the filter controller 21 in accordance with the invention can output the filter control signal 23 by normalizing the difference between the input image signal 12 and an image signal from the frame memory 1 by the image signal from the frame memory 1.

Embodiment 22

Figure 37:
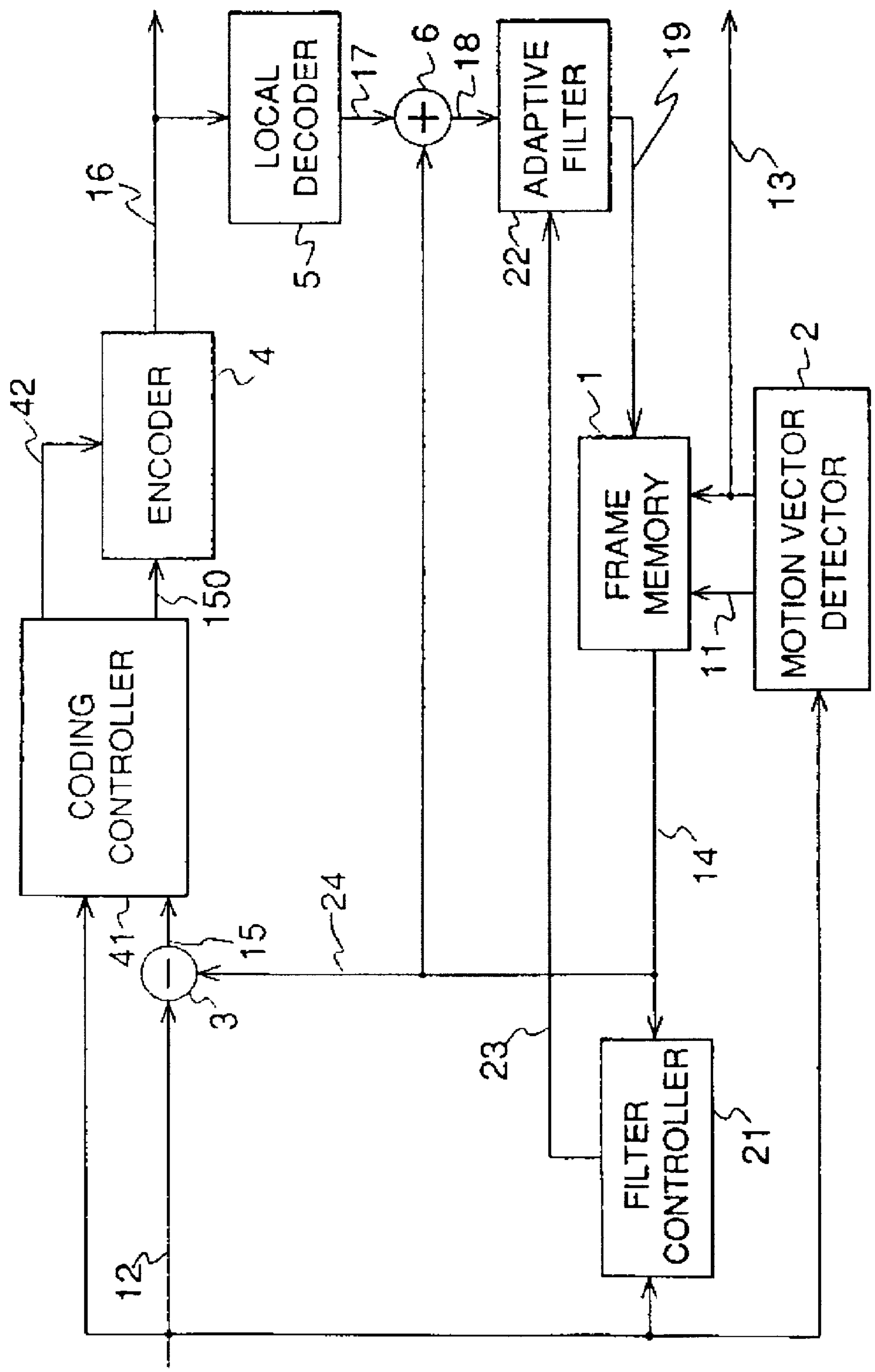
FIG. 37 shows a block diagram of a configuration of an interframe coding system according to another embodiment of the present invention.

With further reference to FIG. 25, the adaptive filter 22 in accordance with the invention can be provided after the adder 6 in the local decoding loop as shown in FIG. 37. The adaptive filter 22 filters the local decoded signal 18 based upon the filter control signal 23 from the filter controller 21. As a result, either the filtered or unfiltered local decoded signal is stored in the frame memory 1. The filtered, for instance, image signal 14 or predictive signal 24 from the frame memory 1 is subtracted from the input image signal 12 in the subtractor 3 to output the predictive error signal 15 for interframe coding.

Embodiment 23

The frame memory 1 in accordance with the invention can store an image signal by the field instead of the frame. The frame memory can also store a multiple number of time-varying frames or fields instead one frame or one field.

Embodiment 24

Figure 38:
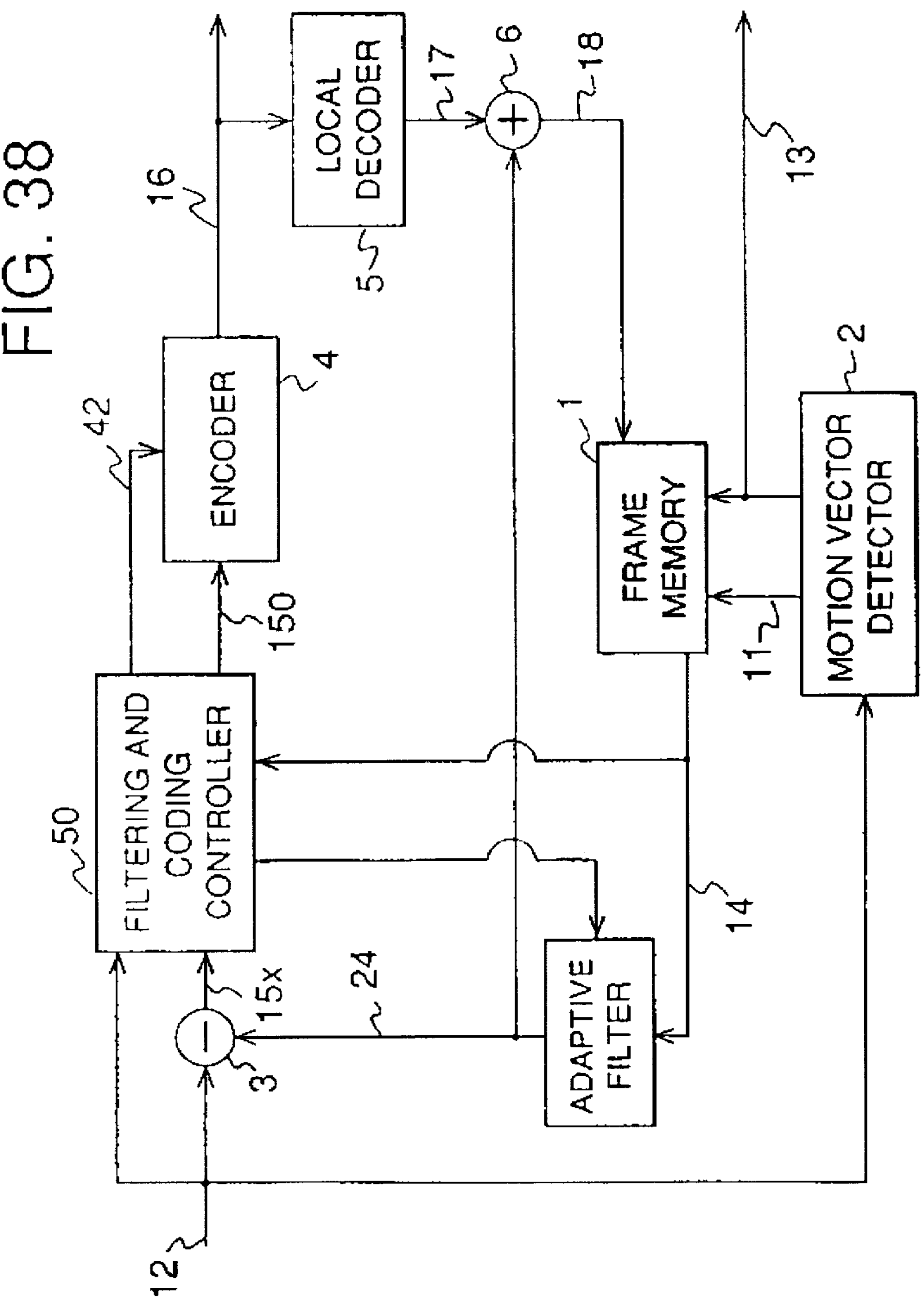
FIG. 38 shows a block diagram of a configuration of an interframe coding system according to another embodiment of the present invention.

FIG. 38 shows a configuration of interframe coding system in accordance with the invention. FIG. 38 comprises FIG. 25, as modified by adding a coding-filtering controller 50 instead of providing separately the filter controller 21 and the coding controller 41. Both of the filter controller and coding controller calculate the "Activity" of an image signal in the same manner to control a signal and therefore it may be desirable to integrate them in terms of the concentration of the similar unit including the same function. Thus, the integrated controller of filtering and coding can provide more control efficient coding system and contribute to downsizing or minimization of the overall system.

Embodiment 25

With further reference to FIG. 25, the motion vector detector 2 in accordance with the invention can be removed from the system when the system prioritizes simplification. With this configuration, the quantity of motion of an image signal is always considered zero.

Embodiment 26

With further reference to FIGS. 22 through 38, coding control system in accordance with the invention can provide a feedback loop based upon the coded data from the encoder 4 or the local error signal 16, adding to the coding controller 41 or the filtering-coding controller 50.

Figure 39:
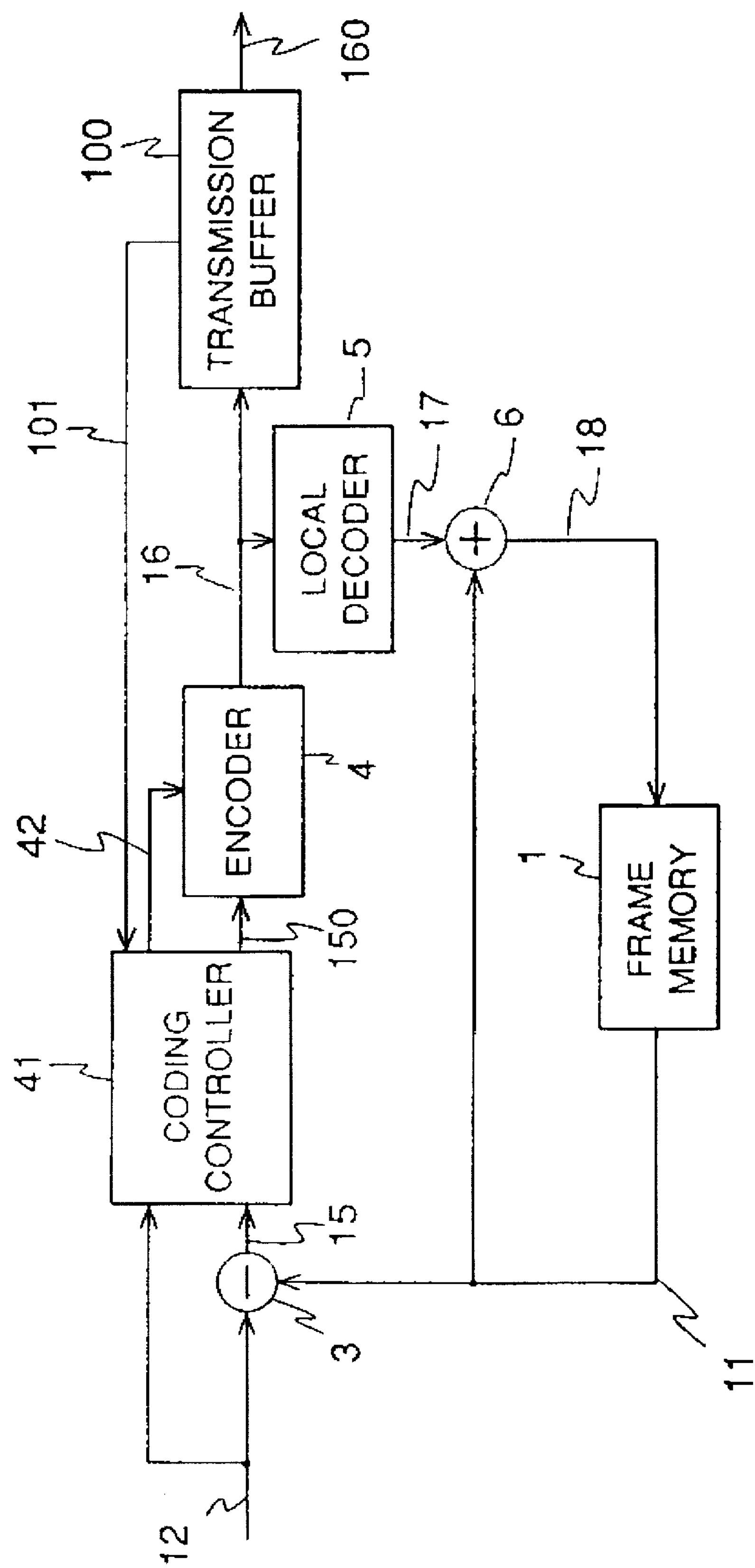
FIG. 39 shows a block diagram of a configuration of an interframe coding system according to another embodiment of the present invention.

FIG. 39 shows a configuration of the interframe coding system according to this embodiment. FIG. 39 comprises FIG. 22, as modified by adding a transmission buffer 100, a transmission signal 160 and a feedback signal 101. The transmission buffer 100 stores coded data from the encoder 4 based upon the coded error signal 16. The transmission signal 160 of the coded error signal 16 is transmitted onto a transmission line from the transmission buffer 100. The feedback signal 101 is fed back to the coding controller 41 from the transmission buffer 100.

Accordingly, the coding controller 41 controls coding with the coding control signal 42 by the feedback signal 101. The feedback signal 101 indicates, for instance, occupied ratio of coded error signals 16 in the transmission buffer 100. In reception of the occupied ratio, the coding controller 41 controls coding with the coding control signal 42 to reduce the amount coding in the encoder 4, for instance, when the coded error signal 16 occupies the transmission buffer 100 in larger proportion. On the contrary, the coding controller 41 controls coding to increase the amount of coding in the encoder 4 with the coding control signal 42, for instance, when the coded error signal 16 occupies the transmission buffer 100 in smaller proportion.

Embodiment 27

With further reference to the foregoing embodiments, the "Activity" of an image signal in accordance with the invention can be represented in a variety of manners as a characteristic of the image signal. The foregoing embodiments provide the "Activity", a characteristic, of an image signal by a difference between image signals or by the sum of the absolute or squared difference values of an image signal vs. the mean value. There are other possible forms of the "Activity" of an image signal using other difference signals or the variance technique.

Embodiment 28

With further reference to the foregoing embodiments, the processing unit of image signal in accordance with the invention can be a block of 16×16, 32×32, or 8×16 pixels for example, instead of a block of 8×8 pixels. Otherwise, the processing unit can possibly be other forms, instead of a block of pixels.

Embodiment 29

With further reference to the foregoing embodiments, a coding signal or coding data in accordance with the invention can be based upon radar signal or sound signal, instead of image signal.

As described hereinbefore, one of the distinctive features of the interframe coding system of the present invention is that the filter controller normalizes a difference between the input image signal and the signal from the frame memory by either the input image signal or the signal from the frame memory. The filter controller generates the filter control signal based upon the normalization to control filtering intensity for eliminating higher frequency components in the signal. The filter controller also generates the filter control signal based upon comparison between the "Activity" of the input image signal or of difference and a threshold value. Accordingly, filtering can be operated adaptively to each image signal, so that an image signal can be provided free from higher frequency components in the encoder for coding. This can contribute to a highly efficient coding leading to a high definition coded image even with motion.

Another distinctive feature of the interframe coding system of the present invention is that the coding controller controls the quantization step size based upon one of the three signals which are a difference signal between the input image signal and the signal from the frame memory, the input image signal, and the signal from the frame memory. This can contribute to reducing the amount of coding error in a coded image signal.

Another distinctive feature of the present invention is that the coding controller controls coding in the encoder by the mode signal based upon the signal with the optimal "Activity" or characteristic of either the input image signal or the predictive error signal. This can contribute to a highly efficient coding.

As stated hereinbefore, the interframe coding system and method of the present invention have the following advantageous effects.

One of the advantageous features is that the filter controller controls filtering intensity for eliminating higher frequency components in an image signal by using the difference between the input image signal and the image signal from the frame memory, whereby an image signal can be provided free from higher frequency components in the encoder leading to a highly efficient coding.

Another advantageous feature is that filtering operation is designed to deal with any image signals comprehensively including pictures with no or little motion and pictures with motion. Therefore pictures with motion can keep the original definition, while pictures with no or little motion can acquire high definition coded image by eliminating higher frequency components in the signal.

Another advantageous feature is that filtering can produce a highly coding efficient image signal by eliminating higher frequency components in the signal in the event that the predictive signal still contains a large amount of quantization error.

Another advantageous feature is that filtering intensity can be altered in various degrees adapted to each image signal for a proper elimination of higher frequency components in the signal. This can provide a high quality predictive image for a highly efficient coding with a smaller coding loop gain.

Another advantageous feature is that a pixel difference is used to control coding error, so that a decoded image can carry less coded error. This can contribute to a highly efficient prediction for the forthcoming frames of an image signal.

As stated hereinbefore, the interframe coding system and method of the present invention also have the following advantageous effects.

One of the advantageous features is that the coding controller outputs the coding control signal based upon the "Activities" of the input image signal and the predictive error signal. This can improve coding efficiency.

Another advantageous feature is that the coding controller adds weight on the "Activity" of an input image signal. The coding controller can control the output ratio of an image signal as the select signal from the coding controller in accordance with a user's or system's needs or the condition of the processing image signal.

Another advantageous feature is that filtering control and coding control are designed to deal with any image signals comprehensively including pictures with no or little motion and pictures with motion. Therefore pictures with motion can keep the original definition, Awhile pictures with no or little motion can acquire high definition coded image by eliminating higher frequency components in the signal.

Another advantageous feature is that filtering can produce a highly coding efficient image signal by eliminating higher frequency components in the signal in the event that the predictive signal still contains a large amount of quantization error. Further, the coding controller outputs the coding control signal based upon the signal with the smallest "Activity" among others, so that the coding efficiency can be improved.

Another advantageous feature is that the coding controller outputs the coding control signal based upon the mode signal by selecting the image signal with the smallest "Activity" among others. This can improve the coding efficiency by providing a highly efficient prediction with less coding loop gain.

What is claimed is:

1. An interframe coding system for frame-to-frame coding of an input signal, comprising:

a subtractor having inputs to receive the input signal and a predictive signal and an output to provide a predictive error signal corresponding to a difference between the input signal and the predictive signal;

an encoder having an input coupled to the output of the subtractor to receive the predictive error signal, having an output that provides a coded predictive error signal, and having a control input that receives a coding control signal for controlling a quantization step size of the encoder;

decoding means for producing a decoded signal having an input coupled to the output of the encoder to receive the coded predictive error signal, having an input to receive the predictive signal, and having an output that provides the decoded signal;

a frame memory having an input that receives the decoded signal and having an output that provides the predictive signal;

a controller having inputs that receive the input signal and the predictive signal, that calculates a difference between the input signal and the predictive signal and generates the coding control signal based on the difference, and having an output coupled to the control input of the encoder that provides the coding control signal for controlling the encoder.

2. The interframe coding system of claim 1, wherein the controller includes:

a difference calculator that receives the input signal and the predictive signal that calculates a difference between the input signal and the predictive signal and that outputs a difference signal;

a pixel difference calculator that receives the difference signal, that calculates an average value of the difference per each pixel, and that outputs the difference value per each pixel as the coding control signal, to the encoder; and wherein the encoder includes means for quantizing the input signal with a step size and for changing the step size of quantization in response to the coding control signal so that coding error becomes smaller than the average value of the difference per each pixel.

3. The interframe coding system of claim 1, further including a motion vector detector which receives the input signal and a previous input signal, output by the frame memory, and outputs a motion vector signal and wherein the frame memory receives the motion vector signal and the decoded signal and outputs the predictive signal.

4. The interframe coding system of claim 1, wherein the interframe coding system further includes a filter, having inputs that receive a filter control signal and the predictive signal and having an output that provides the predictive signal, the filter setting characteristics of the filter in response to the filter control signal; and the controller further includes a difference calculator that receives the input signal and the predictive signal, that calculates a difference between the input signal and the predictive signal and that outputs a difference signal, and means for generating the filter control signal responsive to the input signal and the predictive signal, said means having an output coupled to the filter.

5. The interframe coding system of claim 4, wherein the filter is any one of a one dimensional filter, a two dimensional filter and a three dimensional filter.

6. The interframe coding system of claim 5, wherein the one of the one-dimensional filter and the two-dimensional filter is achieved by intra-block filtering using only filtering coefficients, within a corresponding matrix of pixels, of the input signal.

7. The interframe coding system of claim 5, wherein the one of the one-dimensional filter and the two-dimensional filter is achieved by inter-block filtering using filtering coefficients, corresponding to pixels within an adjacent matrix of pixels of the input signal.

8. The interframe coding system of claim 4, wherein the controller further comprises a decision unit that receives the difference signal and the input signal, that calculates an activity value of the input signal and that outputs the filter control signal; and wherein the filter includes a plurality of patterns of filtering coefficients and a means for selecting one of the plurality of patterns of filtering coefficients in response to the filter control signal.

9. The interframe coding system of claim 8, wherein the decision unit includes means for normalizing the difference signal by the activity value to provide the filter control signal.

10. The interframe coding system of claim 8, wherein the decision unit includes means for calculating a characteristic of the input signal, for comparing the characteristic with a predefined threshold value and for issuing the filter control signal in response to a comparison result.

11. The interframe coding system of claim 8, wherein the difference signal is a summation, for each pixel, of an absolute value of a difference between the input signal and the predictive signal.

12. The interframe coding system of claim 8, wherein the difference signal is a summation, for each pixel, of a squared value of a difference between the input signal and the predictive signal.

13. The interframe coding system of claim 8, wherein the activity value is a difference between a maximum intensity of the input signal and a minimum intensity of the input signal.

14. The interframe coding system of claim 8, wherein the activity value is a summation of an absolute value of a difference between a mean value of a luminance intensity of the input signal and a luminance intensity of each pixel of the input signal.

15. The interframe coding system of claim 8, wherein the activity value is a summation of a squared value of a difference between a mean value of a luminance intensity of the input signal and a luminance intensity of each pixel of the input signal.

16. The interframe coding system of claim 4, wherein the controller further comprises:

a decision unit that receives the difference signal and the predictive signal, that calculates an activity value of the predictive signal and that normalizes the difference signal by the activity value to produce the filter control signal; and wherein the filter includes a plurality of patterns of filtering coefficients and a means for selecting one of the plurality of patterns of filtering coefficients in response to the filter control signal.

17. The interframe coding system of claim 16, wherein the difference signal is a summation, for each pixel, of an absolute value of a difference between the input signal and the predictive signal.

18. The interframe coding system of claim 16, wherein the difference signal is a summation, for each pixel, of a squared value of a difference between the input signal and the predictive signal.

19. The interframe coding system of claim 16, wherein the activity value is a difference between a maximum intensity of the predictive signal and a minimum intensity of the predictive signal.

20. The interframe coding system of claim 16, wherein the activity value is a summation of an absolute value of a difference between a mean value of a luminance intensity of the predictive signal and a luminance intensity of each pixel of the predictive signal.

21. The interframe coding system of claim 16, wherein the activity value is a summation of a squared value of a difference between a mean value of a luminance intensity of the predictive signal and a luminance intensity of each pixel of the predictive signal.

22. The interframe coding system of claims 8 or 16, wherein the decision unit includes means for comparing the difference signal and a predefined threshold value and for issuing the filter control signal in response to a comparison result.

23. The interframe coding system of claim 22, wherein if the difference signal is greater than the predefined threshold value, the filter control signal is issued so as to turn on the filter to filter out any high frequency components of the predictive signal.

24. The interframe coding system of claim 22, wherein if the difference signal is less than the predefined threshold value, the filter control signal is issued so as to bias off the filter.

25. The interframe coding system of claims 8 or 16, wherein the decision unit includes means for comparing the activity value and a predefined threshold value and for issuing the filter control signal, and wherein if the activity value is less than the predefined threshold value, the filter control signal is issued so as to bias on the filter and so as to filter out any high frequency components from the predictive signal.

26. The interframe coding system of claims 8 or 16, wherein the decision unit includes means for comparing the activity value and a predefined threshold value and for issuing the filter control signal, and wherein if the activity value is greater than the predefined threshold value, the filter control signal is issued so as to bias off the filter.

27. The interframe coding system of claims 8 or 16, wherein the decision unit further includes:

means for dividing the difference signal by the activity value and for outputting a division result; and means for comparing the division result and a predefined threshold value and for issuing the filter control signal, wherein if the division result is less than the predefined threshold value, the filter control signal is issued to bias off the filter.

28. The interframe coding system of claims 8 or 16, wherein the decision unit further comprises:

means for dividing the difference signal by the activity value and for outputting a division result; and means for comparing the division result and a predefined threshold value and for issuing the filter control signal, wherein if the division result is greater than the predefined threshold value, the filter control signal is issued so as to bias on the filter so as to filter out any high frequency components from the predictive signal.

29. An interframe coding system for frame-to-frame coding of an input signal, comprising:

a subtractor having inputs to receive the input signal and a predictive signal and an output to provide a predictive error signal corresponding to a difference between the input signal and the predictive signal;

an encoder having an input coupled to the output of the subtractor to receive the predictive error signal, having an output that provides a coded predictive error signal, and having a control input that receives a coding control signal for controlling a quantization step size of the encoder;

decoding means for producing a decoded signal having an input coupled to the output of the encoder to receive the coded predictive error signal, having an input to receive the predictive signal, and having an output that provides the decoded signal;

a frame memory having an input that receives the decoded signal, and having an output that provides the predictive signal;

a controller that receives the input signal and the predictive signal, that calculates an activity value from at least one of the input signal and the predictive signal and that outputs the coding control signal based on the activity value to the encoder to control the quantization step size of the encoder.

30. An interframe coding method for frame-to-frame coding of an input signal in a coding system, wherein the coding system includes a local decoding loop including an encoder for interframe coding a predictive error signal, a subtractor that receives the input signal and a predictive signal and provides the predictive error signal corresponding to a difference between the predictive signal and the input signal, decoding means for producing a decoded signal, a frame memory for receiving the decoded signal and outputting the predictive signal, and a controller that receives the input signal and the predictive signal and provides a coding control signal to the encoder, the interframe coding method comprising the steps of:

(a) calculating a difference, with the controller, between the input signal and the predictive signal and generating the coding control signal based on the difference;

(b) selecting a step size of quantization, in the encoder, responsive to the coding control signal; and (c) coding the predictive error signal based on the selected step size of quantization.

31. An interframe coding method for frame-to-frame coding of an input signal in a coding system, wherein the coding system includes a local decoding loop including an encoder for interframe coding a predictive error signal, a subtractor that receives the input signal and a predictive signal and provides the predictive error signal corresponding to a difference between the predictive signal and the input signal, decoding means for producing a decoded signal, a frame memory for receiving the decoded signal and outputting the predictive signal, and a controller that receives the input signal and the predictive signal and provides a control signal to the encoder, the interframe coding method comprising the steps of:

(a) providing a characteristic signal from the controller indicating a relative characteristic of one of the input signal and the predictive signal;

(b) selecting a step size of quantization, in the encoder, based on the characteristic signal; and, (c) coding the predictive error signal based on the selected step size of quantization.

32. An interframe coding system for frame-to-frame coding of an input signal including a local decoding loop, comprising:

a subtractor, responsive to the input signal and a predictive signal that provides a predictive error signal corresponding to a difference between the input signal and the predictive error signal;

an encoder, responsive to the predictive error signal and a coding control signal, for interframe coding of the predictive error signal and for outputting an encoded signal, the encoder selecting a step size of quantization in response to the coding control signal;

a decoder, responsive to the encoded signal, that decodes the encoded signal and outputs a decoded signal;

a frame memory, responsive to the decoded signal, that calculates the predictive signal, corresponding to a motion compensation prediction of the input signal based on a previous image signal, and that outputs the predictive signal; and a controller having inputs that receive the input signal and the predictive signal, that calculates a difference between the input signal and the predictive signal and that generates the coding control signal based on the difference.

33. An interframe coding system for frame-to-frame coding of an input signal, comprising:

a subtractor, responsive to the input signal and a predictive signal that provides a predictive error signal corresponding to a difference between the input signal and the predictive error signal;

an encoder, responsive to the predictive error signal and a coding control signal, for interframe coding of the predictive error signal and for outputting an encoded signal, the encoder selecting a step size of quantization in response to the coding control signal;

a decoder, responsive to the encoded signal, that decodes the encoded signal and outputs a decoded signal;

a frame memory, responsive to the decoded signal, that calculates the predictive signal, corresponding to a difference between the input signal and a previous input signal, and that outputs the predictive signal; and a controller, responsive to the input signal and the predictive signal, that calculates an activity value from at least one of the input signal and the predictive signal and that outputs the coding control signal based on the activity value.

* * * * *